(12) United States Patent
Mikami et al.

(10) Patent No.: US 10,337,376 B2
(45) Date of Patent: Jul. 2, 2019

(54) EXHAUST GAS PURIFICATION SYSTEM FOR AN INTERNAL COMBUSTION ENGINE

(71) Applicant: Toyota Jidosha Kabushiki Kaisha, Toyota-shi, Aichi-ken (JP)

(72) Inventors: Akira Mikami, Mishima (JP); Shigeki Nakayama, Gotemba (JP); Keishi Takada, Kanagawa-ken (JP); Nobumoto Ohashi, Shizuoka-ken (JP); Junichi Matsuo, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 50 days.

(21) Appl. No.: 15/527,891

(22) PCT Filed: Dec. 15, 2015

(86) PCT No.: PCT/JP2015/006237
§ 371 (c)(1),
(2) Date: May 18, 2017

(87) PCT Pub. No.: WO2016/103627
PCT Pub. Date: Jun. 30, 2016

(65) Prior Publication Data
US 2018/0328246 A1 Nov. 15, 2018

(30) Foreign Application Priority Data
Dec. 24, 2014 (JP) .................... 2014-261061

(51) Int. Cl.
| | | |
|---|---|---|
| *F01N 3/20* | (2006.01) | |
| *F01N 3/025* | (2006.01) | |
| *F01N 3/035* | (2006.01) | |
| *F01N 3/08* | (2006.01) | |
| *F01N 9/00* | (2006.01) | |
| *F02D 41/02* | (2006.01) | |
| *F02D 41/40* | (2006.01) | |
| *F01N 3/10* | (2006.01) | |
| *F01N 13/00* | (2010.01) | |
| *B01D 46/00* | (2006.01) | |
| *B01D 53/94* | (2006.01) | |

(52) U.S. Cl.
CPC ......... *F01N 3/208* (2013.01); *B01D 46/0027* (2013.01); *B01D 46/0061* (2013.01); *B01D 53/9418* (2013.01); *B01D 53/9431* (2013.01); *B01D 53/9495* (2013.01); *F01N 3/0253* (2013.01); *F01N 3/035* (2013.01); *F01N 3/0814* (2013.01); *F01N 3/0842* (2013.01); *F01N 3/106* (2013.01); *F01N 3/2066* (2013.01); *F01N 9/002* (2013.01); *F01N 13/009* (2014.06); *F02D 41/025* (2013.01); *F02D 41/027* (2013.01); *F02D 41/029* (2013.01); *F02D 41/0275* (2013.01); *F02D 41/405* (2013.01); *B01D 2279/30* (2013.01); *F01N 2430/085* (2013.01); *F01N 2510/06* (2013.01); *F01N 2570/14* (2013.01); *F01N 2610/02* (2013.01); *F01N 2610/03* (2013.01); *F01N 2900/1402* (2013.01); *F01N 2900/1404* (2013.01); *F01N 2900/1602* (2013.01); *F02D 2200/0802* (2013.01); *Y02T 10/24* (2013.01); *Y02T 10/26* (2013.01); *Y02T 10/44* (2013.01); *Y02T 10/47* (2013.01)

(58) Field of Classification Search
CPC ...... F01N 3/0253; F01N 3/035; F01N 3/0814; F01N 3/0842; F01N 3/106; F01N 3/208; F01N 9/002; F01N 2430/085; F01N 2510/06; F01N 2570/14; F01N 2610/02; F01N 2610/03; F01N 2900/1404; F01N 2900/1602; F02D 41/025; F02D 41/0275; F02D 41/029; F02D 41/405; F02D 2200/0802
See application file for complete search history.

(56) References Cited

U.S. PATENT DOCUMENTS

| | | | | |
|---|---|---|---|---|
| 2007/0256405 | A1* | 11/2007 | Gabe ................. | B01D 53/9431 60/274 |
| 2010/0058741 | A1 | 3/2010 | Toshioka et al. | |
| 2010/0307132 | A1* | 12/2010 | Yuza ................. | B01D 53/9472 60/274 |
| 2011/0072806 | A1* | 3/2011 | Nagaoka ................... | F01N 3/02 60/301 |
| 2015/0330275 | A1 | 11/2015 | Mikami et al. | |

FOREIGN PATENT DOCUMENTS

| | | |
|---|---|---|
| JP | 2005030272 A | 2/2005 |
| JP | 2009041437 A | 2/2009 |
| JP | 2010116817 A | 5/2010 |
| JP | 2010180814 A | 8/2010 |
| JP | 2014001683 A | 1/2014 |
| JP | 2014148908 A | 8/2014 |
| WO | 2014102932 A1 | 7/2014 |

\* cited by examiner

*Primary Examiner* — Audrey K Bradley
(74) *Attorney, Agent, or Firm* — Dinsmore & Shohl LLP

(57) ABSTRACT

An exhaust gas purification system comprises a first fuel supply unit to supply fuel to exhaust gas flowing in an exhaust passage by a supply valve arranged in the exhaust passage, and a second fuel supply unit to supply fuel to exhaust gas by adjusting a fuel injection condition, wherein in a temperature raising stage of the NOx SCR catalyst associated with the exhaust gas temperature raising processing, first control is performed in which fuel is supplied by the first fuel supply unit, and in a temperature holding stage of the NOx SCR catalyst associated with the exhaust gas temperature raising processing, at least second control is performed in which the ratio of an amount of fuel supply by the second fuel supply unit with respect to an amount of fuel supply by the first fuel supply unit becomes higher in comparison with that when performing the first control.

8 Claims, 9 Drawing Sheets

FIG. 7
(a) Low Ga
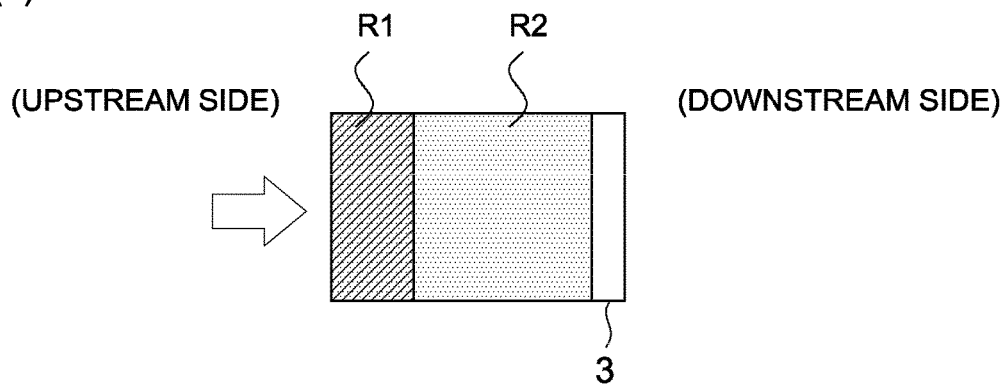
(b) High Ga
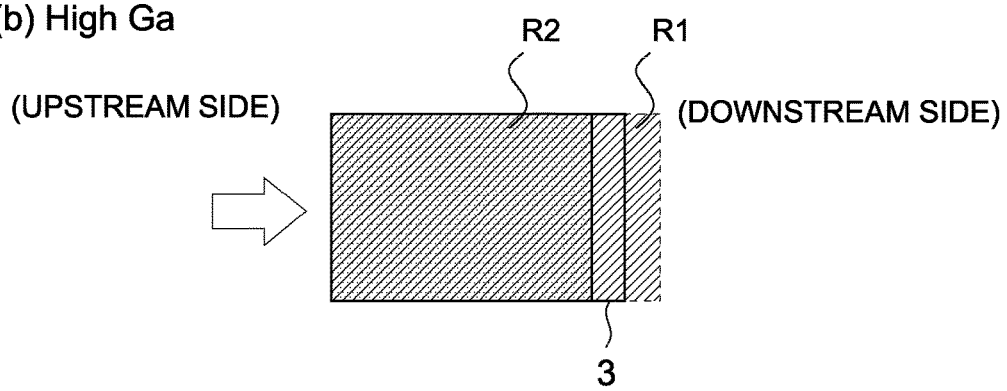

EXHAUST GAS PURIFICATION SYSTEM FOR AN INTERNAL COMBUSTION ENGINE

CROSS-REFERENCE TO RELATED APPLICATIONS

This application is a National Stage of International Application PCT/JP2015/006237 filed on Dec. 15, 2015, which claims priority to Japanese Patent Application No. 2014-261061, filed Dec. 24, 2014, the entire contents of which are hereby incorporated by reference.

FIELD

The present disclosure relates to an exhaust gas purification system for an internal combustion engine.

BACKGROUND

An NOx selective catalytic reduction catalyst for reducing NOx in exhaust gas may be arranged in an exhaust passage of an internal combustion engine. In general, the NOx selective catalytic reduction catalyst is formed such that at least one kind of active component, such as Fe, Cu or the like, exhibiting a selective catalytic reduction property with respect to NOx is supported in the pores of zeolite by ion exchange. In the NOx selective catalytic reduction catalyst, the NOx in the exhaust gas is selectively reduced by the supply of ammonia. Here, fuel in the exhaust gas may adhere to the NOx selective catalytic reduction catalyst and the fuel thus adhered covers the active component, thereby leading to a fuel poisoning state where the NOx reduction ability of the NOx selective catalytic reduction catalyst decreases. This fuel poisoning state causes a decrease in the NOx removal or purification rate of the NOx selective catalytic reduction catalyst. For that reason, there has been developed a technology in which the temperature of the NOx selective catalytic reduction catalyst, which has fallen into the fuel poisoning state, is raised, thereby eliminating the poisoning state, for example, as shown in Japanese patent laid-open publication No. 2009-41437. In addition, with respect to, not the NOx selective catalytic reduction catalyst, but the NOx storage reduction catalyst, there has been disclosed, for example in Japanese patent laid-open publication No. 2005-30272, a technology of limiting an amount of fuel in exhaust gas so as to prevent the occurrence of such a fuel poisoning state, similarly, in view of the decrease in the NOx purification rate due to fuel poisoning.

Further, in an exhaust gas purification system having a selective catalytic reduction filter (SCR filter) which is formed by carrying an NOx selective catalytic reduction catalyst on a filter, filter regeneration processing is carried out in which fuel is supplied into exhaust gas in order to oxidize and remove particulate matter deposited on the SCR filter, so that the temperature of the exhaust gas is caused to rise in an oxidation catalyst disposed on the upstream side of the SCR filter (for example, see Japanese patent laid-open publication No. 2014-148908). When such filter regeneration processing is carried out, fuel is supplied into the exhaust gas, and hence, there arises a possibility that some amount of fuel also may flow into the SCR filter, thereby causing fuel poisoning of the NOx selective catalytic reduction catalyst in the SCR filter.

SUMMARY

In an exhaust gas purification system which is configured such that in an exhaust passage, there are disposed an NOx selective catalytic reduction catalyst and an oxidation catalyst on the upstream side thereof, it has been found that the NOx selective catalytic reduction catalyst is liable to fall into a fuel poisoning state, when the NOx selective catalytic reduction catalyst is exposed to an exhaust gas atmosphere of high temperature due to the oxidation of fuel which is supplied into the exhaust gas and is oxidized in the oxidation catalyst. It is assumed that when the supplied fuel is oxidized in the oxidation catalyst and the temperature of the oxidation catalyst itself goes up, a part of the supplied fuel will not be oxidized in the oxidation catalyst to a sufficient extent and will become easy to flow into the NOx selective catalytic reduction catalyst as fuel components of small molecular weights.

Further, the NOx selective catalytic reduction catalyst itself is exposed to the exhaust gas of high temperature to rise in temperature, and hence, there is also a tendency for the fuel having flowed into the NOx selective catalytic reduction catalyst from the upstream side thereof to change into fuel components of small molecular weights in the NOx selective catalytic reduction catalyst. Moreover, the pores of the zeolite, which forms the NOx selective catalytic reduction catalyst, may increase in diameter due to the temperature rise. As a result of these, it becomes easy for fuel to come into the pores of the NOx selective catalytic reduction catalyst, thus resulting in that the fuel poisoning of the NOx selective catalytic reduction catalyst becomes easy to occur.

The present disclosure has been made in view of the problems as mentioned above, and the object of the present disclosure is that in an exhaust gas purification system which is configured such that in an exhaust passage, there are disposed an NOx selective catalytic reduction catalyst and an oxidation catalyst on the upstream side thereof, a decrease in the NOx purification performance of the NOx selective catalytic reduction catalyst due to fuel poisoning thereof is suppressed, when the temperature of exhaust gas is raised by the oxidation catalyst through the supply of fuel to the exhaust gas.

Solution to Problem

In order to solve the aforementioned problems, based on the ease of occurrence of fuel poisoning in an NOx selective catalytic reduction catalyst, the present applicant adopts a configuration in which the mode of supplying fuel for raising the temperature of exhaust gas by an oxidation catalyst can be adjusted according to the temperature of the NOx selective catalytic reduction catalyst. Further at the time of this adjustment, consideration to controlling the concentration of fuel in the exhaust gas flowing into the NOx selective catalytic reduction catalyst is taken into account from a point of view of the suppression of fuel poisoning.

Specifically, the present disclosure resides in an exhaust gas purification system for an internal combustion engine which comprises: a first fuel supply unit configured to supply fuel to exhaust gas flowing through an exhaust passage of the internal combustion engine by means of a supply valve arranged in the exhaust passage; a second fuel supply unit configured to supply fuel to exhaust gas to be discharged to the exhaust passage by adjusting a fuel injection condition for the internal combustion engine; an oxidation catalyst arranged in the exhaust passage on a downstream side of the supply valve and having an oxidation function; an exhaust gas purification device arranged in the exhaust passage on a downstream side of the oxidation catalyst, the exhaust gas purification device comprising an exhaust gas purification element having a specific gas purification capacity and an NOx selective catalytic reduction catalyst to carry out selective reduction of NOx by using ammonia as a reducing agent; and a temperature rise control unit configured to carry out temperature raising processing which raises a temperature of exhaust gas flowing into the exhaust gas purification device by supplying fuel to the exhaust gas and oxidizing the supplied fuel in the oxidation catalyst, in order to raise a temperature of the exhaust gas purification element to a predetermined target temperature. Further, in the temperature raising processing, the temperature rise control unit is configured to: raise the temperature of the exhaust gas purification element to the predetermined target temperature by performing first control in which fuel supply by the first fuel supply unit is carried out; and maintain the exhaust gas purification element at the predetermined target temperature by performing at least second control in which a ratio of an amount of fuel supply by the second fuel supply unit with respect to an amount of fuel supply by the first fuel supply unit becomes higher in comparison with that when performing the first control.

In the exhaust gas purification system for an internal combustion engine according to the present disclosure, exhaust gas purification is carried out by the exhaust gas purification device, and the exhaust gas purification device is provided with the exhaust gas purification element and the NOx selective catalytic reduction catalyst. The exhaust gas purification element is a component to which a specific exhaust gas purification capacity is given for the purpose of exhaust gas purification in the exhaust gas purification system. Example of the specific exhaust gas purification capacity of the exhaust gas purification element are a trapping function to trap particulate matter in the exhaust gas, NOx purification ability to reduce or remove NOx in exhaust gas (including a conversion function to convert NOx to ammonia), etc. Moreover, the exhaust gas purification element is a component that can be recognized in distinction from the NOx selective catalytic reduction catalyst. Accordingly, it is possible to arbitrarily adjust the arrangement and structure of the exhaust gas purification element and the NOx selective catalytic reduction catalyst in the exhaust gas purification device, as long as the exhaust gas purification element and the NOx selective catalytic reduction catalyst can be mutually distinguished from each other. For example, the exhaust gas purification element and the NOx selective catalytic reduction catalyst may be arranged in series with each other, or both of them may be formed as a unitary or integral structure.

Here, in order to raise a temperature of the exhaust gas purification element to a predetermined target temperature, the temperature rise control unit carries out temperature raising processing which raises a temperature of exhaust gas flowing into the exhaust gas purification device by supplying fuel to the exhaust gas and oxidizing the supplied fuel in the oxidation catalyst. This predetermined target temperature is suitably set according to the exhaust gas purification capacity possessed by the exhaust gas purification element, and is not limited to a temperature for a particular purpose. Then, this exhaust gas purification device is also provided with the NOx selective catalytic reduction catalyst, so that when the temperature raising processing is carried out, the temperature of the NOx selective catalytic reduction catalyst will also go up with the rise in the temperature of the exhaust gas.

For the temperature raising processing by the temperature rise control unit, a mode by the first fuel supply unit and a mode by the second fuel supply unit are adopted. In the former mode, fuel is supplied through the supply valve to the exhaust gas flowing in the exhaust passage. The first fuel supply unit can supply fuel to the exhaust gas, without being influenced by the operating state of the internal combustion engine, or without affecting the combustion of the internal combustion engine, wherein the fuel thus supplied is not exposed to an atmosphere of relatively high temperature, and so, fuel of a relatively large molecular weight will be sent into the oxidation catalyst. On the other hand, in the latter mode, by adjusting the fuel injection condition such as fuel injection timing in the internal combustion engine, etc., fuel is supplied to the oxidation catalyst, while being contained in the exhaust gas. For that reason, according to the second fuel supply unit, it becomes possible to send fuel of a relatively small molecular weight into the oxidation catalyst, but certain influences (e.g., limitation of a combustion condition such as inhibition of the introduction of an EGR gas) may be exerted on a combustion atmosphere in the internal combustion engine, or inconveniences such as oil dilution by the adhesion of fuel to a cylinder wall surface may be caused.

When standing on the point of view of the rise in the exhaust gas temperature by the oxidation catalyst and the fuel poisoning of the NOx selective catalytic reduction catalyst, the fuel supplied to the exhaust gas may be sufficiently used for oxidation reaction by means of the oxidation catalyst, and not flow into the NOx selective catalytic reduction catalyst located on the downstream side of the oxidation catalyst. In particular, when the temperature raising processing is carried out, the temperature of the NOx selective catalytic reduction catalyst itself will rise, thus resulting in the formation of a situation where fuel poisoning in the NOx selective catalytic reduction catalyst is easy to occur, as stated above. For that reason, in order to suppress the amount of fuel which reaches the NOx selective catalytic reduction catalyst, it is ideal that the oxidation reaction of fuel is completed in the oxidation catalyst, and for example, the mode by means of the second fuel supply unit to supply fuel of a relatively small molecular weight may be adopted. However, various inconveniences may be involved in the mode by means of the second fuel supply unit, as mentioned above.

Accordingly, in the exhaust gas purification system according to the present disclosure, the temperature rise control unit, in the temperature raising processing of the exhaust gas purification element, appropriately adjusts and selects one of the fuel supply modes to the exhaust gas for a stage to raise the exhaust gas purification element to the predetermined target temperature (hereinafter, referred to as a "temperature raising stage") or for a stage to maintain or hold the exhaust gas purification element at the predetermined target temperature (hereinafter, referred to as a "temperature holding stage"). Specifically, in the temperature raising process, the exhaust gas purification element is in a state of not having reached the predetermined target temperature, so the temperature of the NOx selective catalytic reduction catalyst contained in the exhaust gas purification device is also in a relatively low temperature state. Accordingly, in the temperature raising stage, it is in a condition in which the NOx selective catalytic reduction catalyst is relatively hard to be subjected to fuel poisoning, even though fuel flows into the NOx selective catalytic reduction catalyst, and hence, the first control is performed in which the fuel supply by the first fuel supply unit, which has a high degree of freedom with respect to the operation of the internal combustion engine, is at least carried out. On the other hand, in the temperature holding stage, the exhaust gas purification element has reached the predetermined target temperature, so the temperature of the NOx selective catalytic reduction catalyst contained in the exhaust gas purification device has also become relatively high. Accordingly, in the temperature holding stage, the NOx selective catalytic reduction catalyst is placed in a condition in which it itself tends to be subjected to fuel poisoning, as mentioned above, so the fuel supply by the second control able to suppress the concentration of fuel in the exhaust gas flowing into the NOx selective catalytic reduction catalyst is carried out. In the fuel supply by this second control, the ratio of the amount of fuel supply by the second fuel supply unit with respect to the amount of fuel supply by the first fuel supply unit is made higher in comparison with when performing the first control. That is, when the fuel supply by the second control is carried out, fuel whose molecular weight is relatively small will be sent to the oxidation catalyst in a larger amount, in comparison with the case where the fuel supply by the first control is carried out. For that reason, in the oxidation catalyst, the supplied fuel is used for the oxidation reaction in an efficient manner. As a result, it becomes possible to suppress the amount of fuel which flows out from the oxidation catalyst and reaches the NOx selective catalytic reduction catalyst.

According to the exhaust gas purification system constructed in this manner, the fuel supply mode to the exhaust gas is adjusted from a point of view of whether the NOx selective catalytic reduction catalyst is easy to fall into the fuel poisoning state, in the temperature raising stage and the temperature holding stage in the temperature raising processing, or so to speak, the fuel supply by the second fuel supply unit will be utilized in a restrictive manner. As a result, at the time of the temperature raising processing, it becomes possible to suppress the influence exerted on the operation of the internal combustion engine, etc., as much as possible, and to suppress the fuel poisoning of the NOx selective catalytic reduction catalyst, thus making it possible to avoid the decrease of the NOx purification rate.

Here, in the exhaust gas purification system for an internal combustion engine, the exhaust gas purification element may be a filter that serves to trap particulate matter in the exhaust gas discharged from the internal combustion engine, and in that case, the temperature rise control unit carries out, as the temperature raising processing, filter regeneration processing of oxidizing and removing the particulate matter deposited on the filter, by performing the first control and then performing the second control. In the exhaust gas purification device having the filter and the NOx selective catalytic reduction catalyst, the temperature rise control unit carries out the filter regeneration processing for oxidizing and removing the particulate matter deposited on the filter. Then, with respect to the fuel supply to the exhaust gas in the filter regeneration processing, by applying the above-mentioned first control and second control, the fuel poisoning of the NOx selective catalytic reduction catalyst at the time of the filter regeneration processing can be suppressed, and the decrease of the NOx purification rate can be avoided.

Note that the exhaust gas purification device may be formed in such a manner that the NOx selective catalytic reduction catalyst is supported on the filter. That is, the exhaust gas purification device is formed as a so-called SCR filter in which the filter and the NOx selective catalytic reduction catalyst are united or integrated with each other. In such an SCR filter, the temperature rise of the filter by the temperature raising processing is directly reflected on the temperature of the NOx selective catalytic reduction catalyst, so it can be that the NOx selective catalytic reduction catalyst is placed in a condition in which it is easier to be subjected to fuel poisoning. Accordingly, by applying the above-mentioned first control and second control, the fuel poisoning of the NOx selective catalytic reduction catalyst at the time of the filter regeneration processing can be suppressed more effectively, and the decrease of the NOx purification rate can be avoided.

In addition, as another form of the exhaust gas purification device, the exhaust gas purification element may be an NOx storage reduction catalyst that stores the NOx in the exhaust gas discharged from the internal combustion engine, and reduces the NOx thus stored by the supply of the reducing agent. In that case, the temperature rise control unit carries out, as the temperature raising processing, sulfur poisoning recovery processing of removing sulfur oxide (SOx) deposited on the NOx storage reduction catalyst, by performing the first control and then performing the second control. That is, in the exhaust gas purification device having the NOx storage reduction catalyst and the NOx selective catalytic reduction catalyst, the temperature rise control unit carries out the sulfur poisoning recovery processing for recovering the NOx storage function of the NOx storage reduction catalyst. Then, with respect to the supply of fuel to the exhaust gas in the sulfur poisoning recovery processing, by applying the above-mentioned first control and second control, the fuel poisoning of the NOx selective catalytic reduction catalyst at the time of the sulfur poisoning recovery processing can be suppressed, and the decrease of the NOx purification rate can be avoided. Here, note that in the sulfur poisoning recovery processing, by performing the first control and/or the second control, the surrounding atmosphere of the NOx storage reduction catalyst is made into a rich atmosphere in a range in which the NOx selective catalytic reduction catalyst is not subjected to fuel poisoning, with the raising of the temperature of the NOx storage reduction catalyst.

Here, in the exhaust gas purification system described up to above, the temperature rise control unit may carry out, in the second control, only the supply of fuel by the second fuel supply unit without performing the supply of fuel by the first fuel supply unit. With this, in cases where the temperature of the NOx selective catalytic reduction catalyst belongs to a high temperature region, only the supply of fuel by the second fuel supply unit is carried out, so that fuel whose molecular weight is relatively small will be sent into the oxidation catalyst in a larger amount. As a result, it becomes possible to suppress the outflow of fuel from the oxidation catalyst as much as possible, thus making it possible to suppress the fuel poisoning of the NOx selective catalytic reduction catalyst in an effective manner.

Moreover, in the exhaust gas purification system described up to above, it may be constructed so as to be further provided with: a calculation unit to calculate a concentration of fuel in the exhaust gas flowing into the NOx selective catalytic reduction catalyst; and a threshold obtaining unit to obtain, based on the temperature of the NOx selective catalytic reduction catalyst, a predetermined fuel concentration threshold which is a threshold of the concentration of fuel in the exhaust gas flowing into the NOx selective catalytic reduction catalyst, related to the NOx reduction rate by the NOx selective catalytic reduction catalyst. In that case, the temperature rise control unit maintains the exhaust gas purification element at the predetermined target temperature by performing the second control, when the temperature of the NOx selective catalytic reduction catalyst has exceeded a predetermined temperature threshold and the fuel concentration calculated by the calculation unit exceeds the predetermined fuel concentration threshold, and maintains the exhaust gas purification element at the predetermined target temperature by performing the first control, without performing the second control, when the temperature of the NOx selective catalytic reduction catalyst exceeds the predetermined temperature threshold and the fuel concentration calculated by the calculation unit does not exceed the predetermined fuel concentration threshold.

The predetermined temperature threshold is a threshold of the catalyst temperature at which the NOx selective catalytic reduction catalyst may fall into the fuel poisoning state when the temperature of the NOx selective catalytic reduction catalyst becomes high, as mentioned above. Accordingly, it can be said that in cases where the temperature of the NOx selective catalytic reduction catalyst exceeds the predetermined temperature threshold, the NOx selective catalytic reduction catalyst may fall into the fuel poisoning state. On the other hand, the NOx selective catalytic reduction catalyst carries out NOx reduction according to its own NOx purification performance or capacity, but as the concentration of fuel in the exhaust gas flowing into the NOx selective catalytic reduction catalyst becomes high, fuel poisoning becomes easy to occur, and the reduction reaction of NOx and ammonia is inhibited by the existence of fuel in the surroundings of the catalyst, as a result of which the NOx purification rate of the NOx selective catalytic reduction catalyst drops. Putting in another way, it can be said that even in cases where the NOx selective catalytic reduction catalyst is easy to fall into the fuel poisoning state from a point of view of the temperature of the NOx selective catalytic reduction catalyst, when the concentration of fuel in the exhaust gas flowing into there is low to some extent, it is possible to avoid the fuel poisoning and to achieve a suitable NOx purification rate in the NOx selective catalytic reduction catalyst.

Accordingly, based on the temperature of the NOx selective catalytic reduction catalyst, the threshold obtaining unit obtains a predetermined fuel concentration threshold which is a parameter related to the NOx purification rate, i.e., an upper limit value of the concentration of fuel in the exhaust gas at which the suitable NOx purification rate in the NOx selective catalytic reduction catalyst can be achieved. Then, based on the above idea, the temperature rise control unit maintains or holds the NOx selective catalytic reduction catalyst at the predetermined target temperature by performing the second control, only when the temperature of the NOx selective catalytic reduction catalyst exceeds the predetermined temperature threshold and the fuel concentration exceeds the predetermined fuel concentration threshold. That is, it is considered that the fuel poisoning of the NOx selective catalytic reduction catalyst can be avoided, when the fuel concentration does no exceed the predetermined fuel concentration threshold even if the temperature of the NOx selective catalytic reduction catalyst exceeds the predetermined temperature threshold. Thus, by limiting an execution condition of the second control in the temperature holding process in this manner, the fuel poisoning of the NOx selective catalytic reduction catalyst can be avoided, thereby making it possible to attain the suppression of a decrease in the NOx purification rate, while suppressing the influence on the operating condition of the internal combustion engine, etc., as much as possible.

Further, in the above-mentioned exhaust gas purification system, the temperature rise control unit may also make the ratio of the amount of fuel supply by the second fuel supply unit with respect to the amount of fuel supply by the first fuel supply unit at the time of carrying out the second control higher in accordance with the higher temperature of the NOx selective catalytic reduction catalyst. The higher the temperature of the NOx selective catalytic reduction catalyst, it follows that the NOx selective catalytic reduction catalyst is in a condition in which the easier the NOx selective catalytic reduction catalyst is to be subjected to fuel poisoning, and the easier the NOx purification rate is to drop. Therefore, as mentioned above, by making the ratio of the amount of fuel supply by the second fuel supply unit with respect to that by the first fuel supply higher as the temperature of the NOx selective catalytic reduction catalyst increases, the amount of fuel flowing out from the oxidation catalyst and reaching the NOx selective catalytic reduction catalyst can be suppressed. Note that in the case of the above-mentioned sulfur poisoning recovery processing, the amount of fuel reaching the NOx selective catalytic reduction catalyst is suppressed in a range in which a desired rich atmosphere is formed in the NOx storage reduction catalyst which is located on the upstream side of the NOx selective catalytic reduction catalyst.

In addition, as another mode of the fuel supply by the second control, the exhaust gas purification system of the present disclosure described up to above may be further provided with: an actual purification rate measurement unit to measure an actual NOx purification rate by the NOx selective catalytic reduction catalyst based on a concentration of NOx in the exhaust gas flowing into the NOx selective catalytic reduction catalyst, and a concentration of NOx in the exhaust gas flowing out from the NOx selective catalytic reduction catalyst; a purification rate estimation unit to estimate a reference NOx purification rate defined as an NOx purification rate that the NOx selective catalytic reduction catalyst is assumed to exhibit, based on an predetermined parameters related to a NOx purification performance of the NOx selective catalytic reduction catalyst; and a poisoning determination unit to determine whether a fuel poisoning state is formed in the NOx selective catalytic reduction catalyst, based on the actual NOx purification rate measured by the actual purification rate measurement unit and the reference NOx purification rate estimated by the purification rate estimation unit. In that case, the temperature rise control unit is configured to: when the temperature of the NOx selective catalytic reduction catalyst exceeds a predetermined temperature threshold and a determination is made by the poisoning determination unit that the fuel poisoning state is formed, maintain the exhaust gas purification element at the predetermined target temperature by carrying out the second control; and when the temperature of the NOx selective catalytic reduction catalyst exceeds the predetermined temperature threshold and the determination is not made by the poisoning determination unit that the fuel poisoning state is formed, maintain the exhaust gas purification element at the predetermined target temperature by performing the first control, without carrying out the second control.

The actual purification rate measurement unit measures the actual NOx purification rate by the NOx selective catalytic reduction catalyst, and the purification rate estimation unit estimates the reference NOx purification rate defined as an NOx purification rate that is assumed to be exhibited by the NOx selective catalytic reduction catalyst. Here, note that the predefined parameter for the estimation of the reference NOx purification rate is a parameter related to a NOx purification performance of the NOx selective catalytic reduction catalyst, and for such a parameter, there can be adopted, for example, the temperature of the NOx selective catalytic reduction catalyst, the flow rate of the exhaust gas, the concentration of NOx flowing into the NOx selective catalytic reduction catalyst, etc. Then, by making a comparison between the actual rate of NOx reduction and the reference rate of NOx reduction estimated, it becomes possible to determine how much the actual NOx reduction performance of the NOx selective catalytic reduction catalyst deviates from original or proper NOx reduction performance which should be required. Thus, in the present disclosure, the poisoning determination unit determines, based on the extent of deviation thus obtained, whether the fuel poisoning state has been formed in the NOx selective catalytic reduction catalyst.

When a determination is made by the poisoning determination unit that the NOx selective catalytic reduction catalyst is in the fuel poisoning state, the NOx purification performance of the NOx selective catalytic reduction catalyst is considered to be in a state of having insufficient margin. When the exhaust gas with high fuel concentration flows into such an NOx selective catalytic reduction catalyst, it becomes more difficult to carry out NOx reduction reaction in an efficient manner. Accordingly, when the temperature of the NOx selective catalytic reduction catalyst exceeds the predetermined temperature threshold and a determination is made that the fuel poisoning state is formed in the NOx selective catalytic reduction catalyst, the temperature rise control unit maintains the NOx selective catalytic reduction catalyst at the predetermined target temperature by performing the second control. As a result of this, by oxidizing the supplied fuel by means of the oxidation catalyst thereby to make it hard to reach the NOx selective catalytic reduction catalyst, it is possible to avoid further progress of the fuel poisoning of the NOx selective catalytic reduction catalyst and the decrease of the NOx purification rate in the temperature holding stage. Here, note that in cases where a determination is not made that the fuel poisoning state is formed in the NOx selective catalytic reduction catalyst, even if the temperature of the NOx selective catalytic reduction catalyst exceeds the predetermined temperature threshold, the second control is not performed, but the first control is performed in order to maintain the temperature of the NOx selective catalytic reduction catalyst at the predetermined target temperature, as a consequence of which the influence on the operating state of the internal combustion engine can be avoided.

Here, in the exhaust gas purification system for an internal combustion engine described up to above, provision is further made for a flow rate obtaining unit configured to obtain a flow rate of exhaust gas in the exhaust passage, wherein the second fuel supply unit is configured to supply fuel to the exhaust gas by carrying out post injection in which the fuel injected is hard to contribute to an output of the internal combustion engine, and is configured to, in cases where the amount of fuel supply by the second fuel supply unit is the same, advance fuel injection timing of the post injection when the flow rate of exhaust gas obtained by the flow rate obtaining unit is large in comparison with when the flow rate of exhaust gas is small.

Moreover, in the exhaust gas purification system for an internal combustion engine described up to above, the temperature rise control unit may carry out pre temperature raising processing of raising the temperature of the NOx selective catalytic reduction catalyst to a predetermined starting temperature at which the first control is started, by carrying out the fuel supply by means of the second fuel supply unit before the execution of the temperature raising processing. The fuel supplied by the first control has a relatively large molecular weight, and hence, in cases where the temperature of the oxidation catalyst is low, the oxidation reaction is hard to go on. Accordingly, before the first control is performed, fuel whose molecular weight is relatively small is supplied by the second fuel supply unit, so that the temperature of the oxidation catalyst is raised to the predetermined starting temperature, after which the first control is performed, thereby making it possible to achieve smooth temperature raising processing.

According to the present disclosure, in an exhaust gas purification system which is configured such that in an exhaust passage, there are disposed an NOx selective catalytic reduction catalyst and an oxidation catalyst on the upstream side thereof, a decrease in the NOx reduction performance of the NOx selective catalytic reduction catalyst due to fuel poisoning thereof can be suppressed, at the time of raising the temperature of exhaust gas by means of the oxidation catalyst through the supply of fuel to the exhaust gas.

BRIEF DESCRIPTION OF DRAWINGS

FIG. 7 is diagram showing the relation between the flow rate of the exhaust gas and the state of heat generation by an oxidation reaction of fuel, in an oxidation catalyst included in the exhaust gas purification system shown in FIG. 1.

DETAILED DESCRIPTION

Hereinafter, specific embodiments of the present disclosure will be described based on the attached drawings. However, the dimensions, materials, shapes, relative arrangements and so on of components described in the embodiments are not intended to limit the technical scope of the present disclosure to these alone in particular as long as there are no specific statements.

<Embodiment 1>

Figure 1:
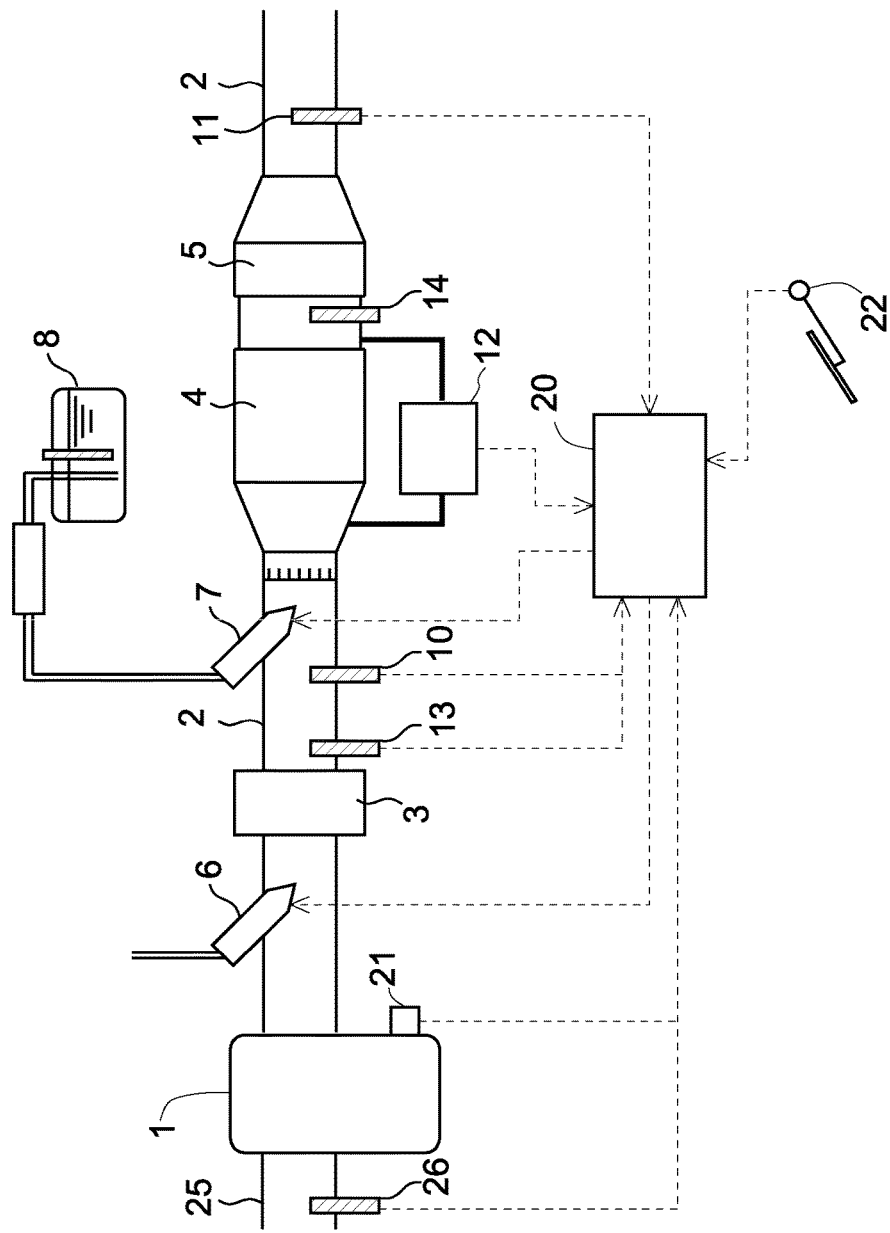
FIG. 1 is a first diagram illustrating schematic construction of an exhaust gas purification system for an internal combustion engine according to the present disclosure.

Reference will be made to an embodiment of an exhaust gas purification system for an internal combustion engine according to the present disclosure, based on the drawings attached to this description. FIG. 1 is a diagram illustrating schematic construction of the exhaust gas purification system for an internal combustion engine according to this embodiment. The internal combustion engine 1 is a diesel engine for driving a vehicle. However, it is to be noted that the internal combustion engine according to the present disclosure is not limited to a diesel engine, but may be a gasoline engine, etc.

An exhaust passage 2 is connected to the internal combustion engine 1. In the exhaust passage 2, there is arranged an SCR filter 4 which is formed such that an NOx selective catalytic reduction catalyst (hereinafter, also referred to simply as an "SCR catalyst") for carrying out selective reduction of NOx in exhaust gas by using ammonia as a reducing agent is supported by a wall flow type filter which serves to trap particulate matter (PM) in the exhaust gas. Further, in order to produce ammonia which acts as a reducing agent in the SCR catalyst supported by the SCR filter 4, urea water, which is stored in a urea tank 8 and which is a precursor of ammonia, is supplied into the exhaust gas by means of a supply valve 7 located on the upstream side of the SCR filter 4. The urea water supplied from the supply valve 7 is hydrolyzed by the heat of the exhaust gas to produce ammonia, and when the ammonia thus produced reaches the SCR filter 4, it will be adsorbed to the SCR catalyst supported there. Then, a reductive reaction of the ammonia and the NOx in the exhaust gas occurs, and a reduction of NOx is carried out. In this embodiment, the urea water is supplied from the supply valve 7 as mentioned above, but instead of that, ammonia or aqueous ammonia may be directly supplied to the exhaust gas.

On the downstream side of the SCR filter 4, there is arranged an oxidation catalyst (hereinafter, referred to as an "ASC catalyst") 5 for oxidizing ammonia which has slipped through the SCR filter 4. In addition, the ASC catalyst 5 may be a catalyst which is composed by combining an oxidation catalyst and an SCR catalyst which serves to reduce the NOx in the exhaust gas by using ammonia as a reducing agent. In this case, the oxidation catalyst may be formed, for example, by carrying a precious metal such as platinum (Pt), etc., on a carrier made of a material such as aluminum oxide (Al2O3), zeolite, etc., and the SCR catalyst may be formed by carrying a base metal such as copper (Cu), iron (Fe), etc., on a carrier made of a material such as zeolite. With the ASC catalyst 5 having such a configuration, HC, CO and ammonia in the exhaust gas can be oxidized, and further, a part of ammonia can be oxidized to produce NOx, and the NOx thus produced can also be reduced by using excessive or surplus ammonia.

Moreover, an oxidation catalyst 3 having an oxidation function is arranged on the upstream side of the SCR filter 4 and the supply valve 7. Further, on the upstream side of the oxidation catalyst 3, there is disposed a fuel supply valve 6 which can supply fuel of the internal combustion engine 1 to the oxidation catalyst 3 through the exhaust gas flowing into the oxidation catalyst 3. The fuel supplied to the exhaust gas from the fuel supply valve 6 is oxidized by the oxidation catalyst 3, so that it can raise the temperature of the exhaust gas flowing into the SCR filter 4 located on the downstream side of the oxidation catalyst 3.

On the upstream side of the SCR filter 4, there is arranged an NOx sensor 10 for detecting the concentration of NOx in the exhaust gas flowing into the SCR filter 4, and on the downstream side of the SCR filter 4, there is arranged an NOx sensor 11 for detecting the concentration of NOx in the exhaust gas flowing out from the SCR filter 4. Further, a temperature sensor 13 for detecting the temperature of the exhaust gas flowing out from the oxidation catalyst 3 is arranged on the downstream side of the oxidation catalyst 3, and a temperature sensor 14 for detecting the temperature of the exhaust gas flowing out from the SCR filter 4 is arranged on the downstream side of the SCR filter 4 and on the upstream side of the ASC catalyst 5. In addition, a differential pressure sensor 12 is arranged for detecting a pressure difference between the pressures of the exhaust gas on the upstream side and on the downstream side of the SCR filter 4. Moreover, an electronic control unit (ECU) 20 is provided in combination with the internal combustion engine 1, and this ECU 20 is a unit that controls the operating state of the internal combustion engine 1, the exhaust gas purification system, and so on. An air flow meter (illustration being omitted), a crank position sensor 21, an accelerator opening sensor 22, an air flow meter 26 that is disposed in an intake passage 25 of the internal combustion engine, and so on, in addition to the NOx sensors 10, 11, the differential pressure sensor 12, and the temperature sensors 13, 14 as mentioned above, are electrically connected to the ECU 20, and the detected values of these individual sensors are passed or transmitted to the ECU 20. Accordingly, the ECU 20 is able to grasp the operating state of the internal combustion engine 1, such as an amount of intake air based on a detected value of the air flow meter 26, a flow rate of the exhaust gas calculated based thereon, an engine rotational speed based on the detection of the crank position sensor 21, an engine load based on the detection of the accelerator opening sensor 22, etc.

Here, note that in this embodiment, the concentration of NOx in the exhaust gas flowing into the SCR filter 4 is able to be detected by the NOx sensor 10, but the concentration of NOx in the exhaust gas discharged from the internal combustion engine 1 (the exhaust gas before being purified or reduced by the SCR filter 4, i.e., the exhaust gas flowing into the SCR filter 4) has a relation with the operating state of the internal combustion engine 1, and hence, is also able to be estimated based on the above-mentioned operating state of the internal combustion engine 1.

Then, according to the concentration of NOx in the exhaust gas detected or estimated in this manner, the ECU 20 gives an instruction to the supply valve 7, so that an amount of urea water necessary for the reduction and removal of the NOx is supplied into the exhaust gas. For example, the supply of urea water from the supply valve 7 may be controlled in such a manner that the actual NOx purification rate by the SCR filter 4 which is determined by the following expression 1 falls in a predetermined range from a point of view of exhaust gas purification, or as an alternate method, an amount of supply of the urea water from the supply valve 7 may be determined based on an estimated amount of ammonia having been adsorbed to the SCR catalyst.

The NOx purification rate=1−(the detected value of the NOx sensor 11)/(the detected value of the NOx sensor 10)     (Expression 1)

Moreover, in the exhaust gas purification system of the internal combustion engine 1 illustrated in FIG. 1, by supplying the urea water from the supply valve 7 according to the concentration of NOx in the exhaust gas as mentioned above, the NOx purification by the SCR filter 4 is carried out, and at the same time, the PM in the exhaust gas is trapped by the filtering function of the SCR filter 4. The amount of PM to be released to the outside can be suppressed by the PM being trapped by the SCR filter 4, but when the amount of PM deposition in the SCR filter 4 becomes large, the operating state of the internal combustion engine 1 will be affected, and hence, in order to oxidize and remove the deposited PM, the temperature of the exhaust gas flowing into the SCR filter 4 is raised by supplying fuel to the exhaust gas and oxidizing the fuel thus supplied by the oxidation function of the oxidation catalyst 3, thus performing filter regeneration control which attains the temperature rise of the SCR filter 4 (corresponds to temperature raising processing of the present disclosure).

Here, in the exhaust gas purification system of the internal combustion engine 1, first control and second control connected with the fuel supply to the exhaust gas are carried out for the filter regeneration control. Specifically, the first control is to carry out the fuel supply from the fuel supply valve 6 to the exhaust gas, wherein the supplied fuel flows into the oxidation catalyst 3, and is used there for oxidation reaction, thereby raising the temperature of the exhaust gas. In addition, the second control is to adjust a fuel injection condition of the internal combustion engine 1 so that fuel is made to be contained in the exhaust gas discharged from the internal combustion engine 1 to the exhaust passage 2. The fuel flows into the oxidation catalyst 3, and is used there for oxidation reaction, thereby causing the temperature of the exhaust gas to rise. As an example of the adjustment of the fuel injection condition, the execution of post injection in the internal combustion engine 1 can be mentioned.

The post injection is fuel injection which is carried out in a period of time in which the fuel injected is hard to contribute to the output of the internal combustion engine 1, for example, in a late stage of an expansion stroke, an early state of exhaust stroke, etc. Accordingly, most of fuel supplied by the post injection will not be used for combustion, but will be exposed to the high temperature exhaust gas in a combustion chamber, and hence, there is a tendency that at the time when the fuel flows into the exhaust passage 2, the molecular weight of the fuel becomes smaller than the molecular weight of fuel supplied to the exhaust gas according to the first control. For that reason, for the fuel supplied according to the second control, the oxidation reaction thereof in the oxidation catalyst 3 will be more promoted, in comparison for the fuel supplied according to the first control. On the other hand, the post injection is carried out in the period of time in which the fuel injected is hard to contribute to the output of the internal combustion engine 1, such as in the late stage of expansion stroke, etc., as mentioned above, so it is easy to cause adhesion of the injected fuel to the inner wall surface of a cylinder. Further, in cases where the internal combustion engine 1 is provided with an EGR device that serves to recirculate exhaust gas to an intake system, the introduction of an EGR gas to a combustion chamber is limited at the time of post injection, and exhaust emission becomes easy to deteriorate at the time of the post injection.

Here, in cases where the filter regeneration control is carried out, whether the fuel supply is carried out according to the first control or the second control, the fuel supplied is used for oxidation reaction in the oxidation catalyst 3, so that the temperature of the oxidation catalyst 3 is raised, and the temperature of the exhaust gas flowing into the SCR filter 4 is also raised. As a result, the filter temperature in the SCR filter 4 will go up, and the temperature of the SCR catalyst supported there will also go up. Here, when the oxidation catalyst 3 becomes high temperature at the time of the filter regeneration control, the oxidation of fuel is promoted, but as a result of the oxidation reaction of the fuel, fuel having a relatively small molecular weight is produced in the oxidation catalyst 3, and it is easy to flow into the SCR filter 4 on the downstream side of the oxidation catalyst 3. In addition, the temperature of the SCR filter 4 itself also becomes high, so in the SCR filter 4, too, a molecular weight reduction of the fuel therein becomes easy to occur. In this manner, when the opportunity for the SCR filter 4 to be exposed to the fuel having a relatively small molecular weight increases, it becomes easy for the SCR catalyst supported by the SCR filter 4 to be subjected to fuel poisoning. In particular, when the SCR filter 4 becomes high temperature, the pores of zeolite forming the SCR catalyst increase in diameter and it becomes easy for fuel to come into the pores, thus resulting in that fuel poisoning is easier to occur.

Figure 2:
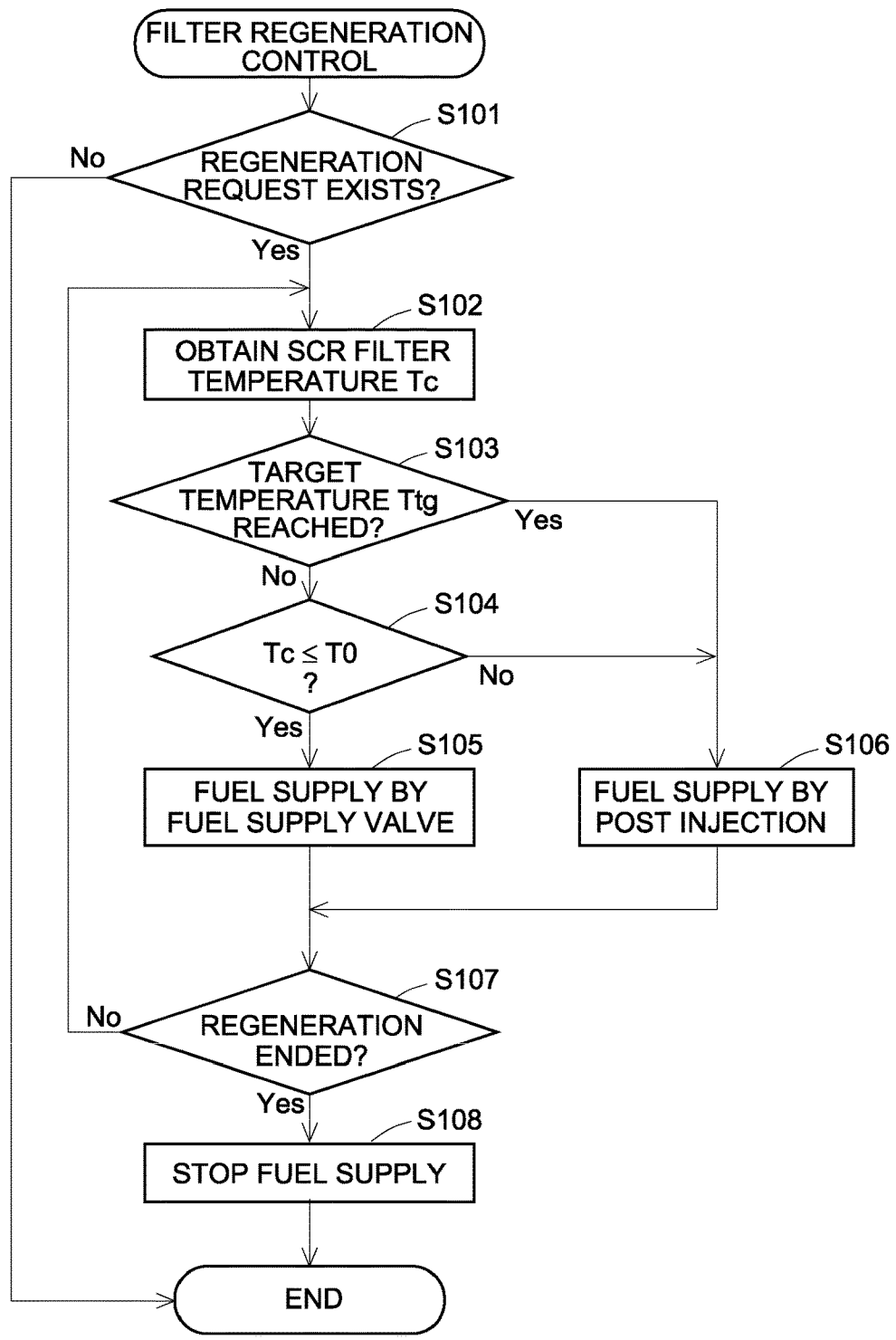
FIG. 2 is a first flow chart with respect to filter regeneration control which is carried out in the exhaust gas purification system shown in FIG. 1.

Accordingly, in this embodiment, from a point of view of the fuel poisoning of the SCR catalyst supported by the SCR filter 4, a temperature range of the SCR filter 4 in which the fuel poisoning tends to occur as mentioned above is defined as a high temperature region, whereas a temperature range lower than the aforementioned temperature range, i.e., a temperature range in which the fuel poisoning does not occur easily, is defined as a low temperature region. Then, in the exhaust gas purification system of the internal combustion engine 1, the filter regeneration control is carried out in which the fuel poisoning of the SCR catalyst in the SCR filter 4 can be suppressed in a suitable manner. This filter regeneration control will be explained based on FIG. 2. Here, note that the filter regeneration control shown in FIG. 2 is carried out by a control program stored in the ECU 20.

First, in step S101, it is determined whether there exists a request for the execution of the filter regeneration control (i.e., regeneration request). In this embodiment, the amount of PM deposition in the SCR filter 4 is estimated based on a detection value by the differential pressure sensor 12, i.e., an exhaust gas pressure difference between the upstream side and the downstream side of the SCR filter 4, and the flow rate of the exhaust gas calculated from the detected value by the air flow meter 26, and in cases where the estimated amount of PM deposition thus obtained exceeds a predetermined deposition amount, the above-mentioned regeneration request will be issued. Here, note that the amount of PM deposition in the SCR filter 4 may be calculated based on the history of amounts of PM contained in the exhaust gas estimated based on the operating state of the internal combustion engine 1. When an affirmative determination is made in step S101, the control flow or routine goes to step S102, whereas when a negative determination is made, this control is ended.

Subsequently, in step S102, the temperature Tc of the SCR filter 4 is obtained based on a detection value by the temperature sensor 14. This temperature of the SCR filter 4 corresponds to the temperature of a filter portion of the SCR filter 4, and also corresponds to the temperature of the SCR catalyst supported there. After the processing of the step S102 is ended, the routine goes to step S103.

In step S103, it is determined based on the temperature Tc obtained in step S102 whether the SCR filter 4 has reached a target temperature Ttg in the filter regeneration control. The target temperature Ttg in the filter regeneration control is a temperature at which the PM deposited on the SCR filter 4 is oxidized and removed continuously, and also is such a temperature at which burning damage of the SCR filter 4 is not caused. Accordingly, in the filter regeneration control, a stage until the temperature Tc of the SCR filter 4 reaches the target temperature Ttg is defined as a temperature raising stage, and a stage in which the deposited PM is oxidized and removed after the target temperature Ttg has been reached, while preventing the SCR filter 4 from being subjected to burning damage is defined as a temperature holding stage.

When an affirmative determination is made in step S103, the routine goes to step S106, whereas when a negative determination is made, the routine goes to step S104.

In step S104, it is determined whether the temperature Tc of the SCR filter 4 is equal to or less than a predetermined temperature threshold T0. This predetermined temperature threshold T0 is a temperature threshold for separating the low temperature region and the high temperature region from each other which are set from the point of view of the fuel poisoning of the SCR catalyst supported by the SCR filter 4, as mentioned above. In the case of this embodiment, this predetermined temperature threshold T0 is a temperature in the course of the temperature raising stage of the SCR filter 4. Accordingly, in cases where the SCR filter 4 is placed in the temperature holding stage, the temperature already belongs to the high temperature region. On the other hand, in cases where the SCR filter 4 is placed in the temperature raising stage, the temperature of the SCR filter 4 belongs to the low temperature region when the temperature of the SCR filter 4 is equal to or less than the predetermined temperature threshold T0, whereas the temperature of the SCR filter 4 belongs to the high temperature region when the temperature of the SCR filter 4 exceeds the predetermined temperature threshold T0.

In the temperature raising stage of the filter regeneration control, the temperature of the SCR catalyst supported by the SCR filter 4 will also be raised with the oxidation reaction in the oxidation catalyst 3. For that reason, when the temperature of the SCR filter 4 (the SCR catalyst) becomes relatively high, i.e., when the temperature of the SCR filter 4 exceeds the predetermined temperature threshold T0, at the time when the fuel supplied to the exhaust gas for the filter regeneration control is oxidized by the oxidation catalyst 3, an environment is created in which fuel with its molecular weight decreased is easy to flow into the SCR catalyst side, and in which due to the rise in temperature of the SCR catalyst, the molecular weight of fuel is easy to be decreased or lowered by the SCR catalyst itself, and an enlargement in diameter of the pores in the zeolite forming the SCR catalyst is easy to occur. As a result, the fuel of a relatively small molecular weight comes into the zeolite of the SCR catalyst, so that the fuel poisoning state of the SCR catalyst is promoted. Here, note that this is also the same in the temperature holding stage of the filter regeneration control. In consideration of the relation between the temperature of the SCR filter 4 and the ease of occurrence of the fuel poisoning of the SCR catalyst at the time of such filter regeneration control, a temperature range of the SCR filter 4 in which the fuel poisoning is hard to occur is defined as the above-mentioned low temperature region, and a temperature range of the SCR filter 4 in which the fuel poisoning is easy to occur is also defined as the above-mentioned high temperature region.

Further, when an affirmative determination is made in step S104, it means that the temperature of the SCR filter 4 belongs to the low temperature region, and in this case, as mentioned above, there has been formed an environment in which the fuel poisoning of the SCR catalyst is hard to occur from the point of view of the temperature of the SCR catalyst. Accordingly, in this case, the fuel supply from the fuel supply valve 6 to the exhaust gas is carried out according to the processing of step S105. This supply of fuel corresponds to the supply of fuel by the first control of the present disclosure. Here, note that the amount of supply of fuel from the fuel supply valve 6 is an amount necessary for raising the temperature of the SCR filter 4, and is decided based on, for example, a difference between the temperature Tc of the SCR filter 4 at the current point in time, and a temperature which should be reached for the oxidation and removal of PM. As a result of this, the raising of the temperature of the SCR filter 4 will be attained by the fuel of a relatively large molecular weight being supplied to the exhaust gas, but the temperature of the SCR filter 4 belongs to the low temperature region, and hence, even if fuel flows out to the downstream side of the oxidation catalyst 3, the fuel is hard to come into the pores in the zeolite of the SCR catalyst, so that the fuel poisoning of the SCR catalyst is hard to occur. On the other hand, the fuel supply valve 6 is utilized for the fuel supply to the exhaust gas, and so, at the time of supplying fuel, it is hard to cause inconveniences such as the limited operation of the internal combustion engine 1, the dilution of fuel in a cylinder, etc.

On the other hand, when a negative determination is made in step S104, it means that the temperature of the SCR filter 4 belongs to the high temperature region, and in this case, as mentioned above, there has been formed an environment in which the fuel poisoning of the SCR catalyst is easy to occur from the point of view of the temperature of the SCR catalyst. Accordingly, in this case, the supply of fuel to the exhaust gas by post injection is carried out according to the processing of step S106, as in the case where the SCR filter 4 has reached the target temperature Ttg. This supply of fuel corresponds to the fuel supply by the second control of the present disclosure. Here, note that an amount of supply of fuel by post injection, i.e., a post injection amount, is an amount necessary for raising or maintaining (holding) the temperature of the SCR filter 4, and is decided based on, for example, a difference between the temperature Tc of the SCR filter 4 at the current point in time and the temperature which should be reached for the oxidation and removal of PM, an amount of heat dissipation from the SCR filter 4, or the like. As a result of this, the raising of the temperature of the SCR filter 4 will be attained by the fuel of a relatively small molecular weight being supplied to the exhaust gas. Thus, when the supply of fuel by post injection is carried out, fuel whose molecular weight is relatively small reaches the oxidation catalyst 3, so that the raising of the temperature of the exhaust gas will be thereby carried out. For that reason, in the oxidation catalyst 3, the supplied fuel is easy to be consumed, so that it becomes hard to flow out to the downstream side of the oxidation catalyst 3. As a result of this, the fuel poisoning of the SCR catalyst supported by the SCR filter 4 can be suppressed.

After the processing of step S105 or S106 ends, the routine goes to step S107. In step S107, it is determined whether the filter regeneration control should be ended. For example, the end of the filter regeneration control can be determined, when a predetermined period of time required for the combustion of PM has elapsed from the start of the supply of fuel to the exhaust gas for raising the temperature of the SCR filter 4. When an affirmative determination is made in step S107, the routine goes to step S108, whereas when a negative determination is made, the processings in step S102 and onward are repeated again. Then, in S108, the fuel supply to the exhaust gas being carried out for raising the temperature of the SCR filter 4 is stopped, and this filter regeneration control is ended.

According to the above-mentioned control, in the case where the filter regeneration control is carried out in order to oxidize and remove the PM deposited on the SCR filter 4, the mode of the supply of fuel to the exhaust gas for raising the temperature of the SCR filter 4 becomes either of a first mode according to the first control or a second mode according to the second control, based on the temperature of the SCR filter 4, i.e., the temperature of the SCR catalyst supported by the SCR filter 4. Specifically, for example, in the case where the SCR filter 4 is placed in the temperature holding process, the supply of fuel by the second control is carried out, whereas in the case where the SCR filter 4 is in the temperature raising process and the temperature thereof is in the low temperature region, the supply of fuel by the first control is carried out. As a result, it becomes possible to achieve the oxidation and removal of the deposited PM, and to avoid the decrease in the NOx purification performance of the SCR filter 4, while aiming at compatibility of the limited operation of the internal combustion engine 1, the suppression of the dilution of oil on the cylinder wall surface, and the suppression of the fuel poisoning of the SCR catalyst.

<Modification>

Here, note that in the filter regeneration control of the above-mentioned first embodiment, post injection is utilized for the supply of fuel to the exhaust gas by the second control in step S106, and the supply of fuel from the fuel supply valve 6 is not carried out. Instead of this, in step S106, the supply of fuel by post injection and the supply of fuel by the fuel supply valve 6 may be used in combination with each other so that the ratio of the amount of fuel supply by the post injection with respect to the amount of fuel supply by the fuel supply valve 6 becomes larger than that at the time of the execution of the first control in step S105. However, in the combined use, in a state where the temperature of the SCR filter 4 belongs to the high temperature region, the amount of fuel supply in particular by the fuel supply valve 6 is controlled not to be excessive, so that the fuel poisoning of the SCR catalyst is not caused. In addition, in the above-mentioned filter regeneration control, in the first control of step S105, only the supply of fuel by the fuel supply valve 6 is carried out, and hence, if the supply of fuel by post injection is carried out at least partially in step S106, there will be carried out the supply of fuel to the exhaust gas in which the above-mentioned ratio becomes larger than that at the time of the execution of the first control. Moreover, in step S105, too, the supply of fuel by the post injection and the supply of fuel by the fuel supply valve 6 may be used together in combination. However, in the combined use, the ratio of the amount of fuel supply by the post injection with respect to the amount of fuel supply by the fuel supply valve 6 is controlled so as to be lower, in comparison with the ratio of the amount of fuel supply by the post injection with respect to the amount of fuel supply by the fuel supply valve 6 in step S106.

<Embodiment 2>

Figure 3:
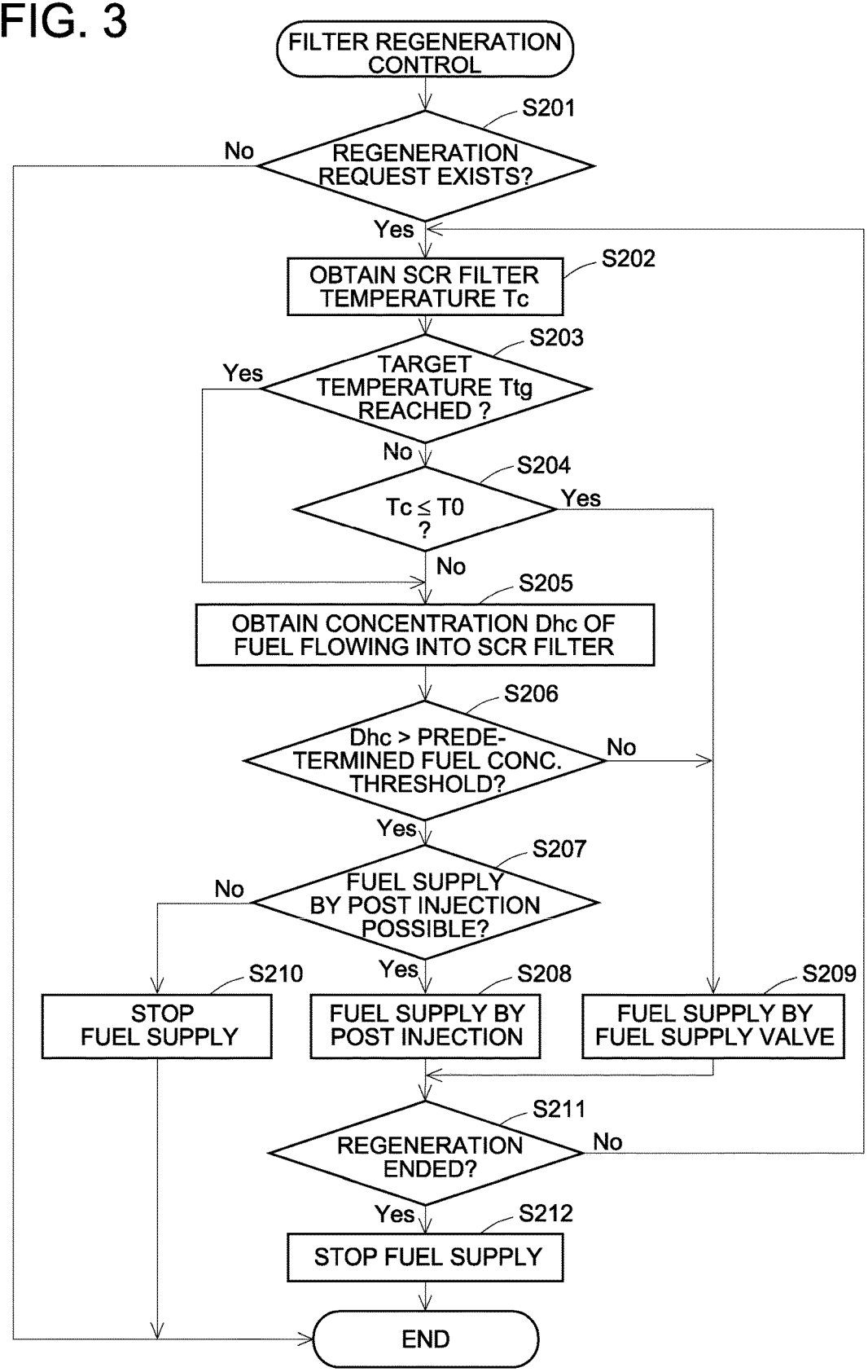
FIG. 3 is a second flow chart with respect to filter regeneration control which is carried out in the exhaust gas purification system shown in FIG. 1.

Reference will be made to a second embodiment of filter regeneration control carried out by the exhaust gas purification system of the internal combustion engine 1, based on FIG. 3. FIG. 3 shows a flow chart of the filter regeneration control carried out by a control program stored in the ECU 20, similar to FIG. 2. First, in step S201, it is determined whether there is any request for the execution of the filter regeneration control (i.e., regeneration request), similar to the above-mentioned step S101. When an affirmative determination is made in step S201, the routine goes to step S202, whereas when a negative determination is made, the routine is ended. Then, in step S202, the temperature Tc of the SCR filter 4 is obtained based on a detection value by the temperature sensor 14, similar to the above-mentioned step S102. After the processing of the step S202 ends, the routine goes to step S203.

Subsequently, in step S203, it is determined whether the SCR filter 4 has reached the target temperature Ttg in the filter regeneration control, similar to the above-mentioned step S103. That is, it is determined whether the SCR filter 4 is placed in the temperature holding process. Then, when an affirmative determination is made in step S203, the routine goes to step S205, whereas when a negative determination is made, the routine goes to step S204. In step S204, it is determined whether the temperature Tc of the SCR filter 4 is equal to or less than the predetermined temperature threshold T0, similar to the above-mentioned step S104. That is, in step S204, from the point of view of the fuel poisoning of the SCR catalyst supported by the SCR filter 4, a determination will be made as to whether in the temperature raising process, the temperature of the SCR filter 4 belongs to the low temperature region or the high temperature region. Accordingly, when an affirmative determination is made in step S204, it unit that the temperature of the SCR filter 4 belongs to the low temperature region, and when a negative determination is made, it unit that the temperature of the SCR filter 4 belongs to the high temperature region. Then, in the case of the affirmative determination, the processing or routine goes to step S209, whereas in the case of the negative determination, the routine goes to step S205.

Subsequently, in step S205, the fuel concentration Dhc of the exhaust gas flowing into the SCR filter 4 is obtained. Here, the fuel concentration Dhc is a concentration of fuel in the exhaust gas which is discharged from the internal combustion engine 1 and reaches the SCR filter 4 while passing through the oxidation catalyst 3, at the time when the filter regeneration control shown in FIG. 3 is carried out. Accordingly, at the time of obtaining the fuel concentration Dhc, consideration will be given to the discharge of fuel from the internal combustion engine 1, the supply of fuel to the exhaust gas for raising the temperature of the SCR filter 4, and the consumption (oxidation reaction) of fuel in the oxidation catalyst 3, and specifically, the fuel concentration Dhc will be calculated according to the following procedure (steps 1 through 4).

(Step 1)

In step 1, the concentration of fuel in the exhaust gas discharged from the internal combustion engine 1 is calculated. Specifically, a control map, in which the correlation of the concentration of fuel in the exhaust gas with respect to the engine load and the engine rotation speed of the internal combustion engine 1 has been stored, is recorded in the ECU 20, wherein by accessing the control map, the calculation of fuel concentration is carried out based on the engine load and the engine rotation speed of the internal combustion engine 1. Here, note that the fuel supplied to the exhaust gas for raising the temperature of the SCR filter 4 in the filter regeneration control in step S208 or S209 to be described later for or S209 is not reflected on the concentration of fuel in the exhaust gas.

(Step 2)

Then, in step 2, after taking into consideration the fuel supplied to the exhaust gas in step S208 or S209 to be described later, an amount of fuel per unit time flowing into the oxidation catalyst 3 is calculated (here, it is to be noted that when a negative determination is made in step S211 after the processing of step S208 or S209, the processing of step S205 is carried out). Specifically, the amount of fuel per unit time flowing into the oxidation catalyst 3 is calculated by adding the amount of fuel supply in step S208 or S209 to a value which is obtained by multiplying the fuel concentration calculated in the above-mentioned step 1 and the flow rate of the exhaust gas calculated based on the detected value of the air flow meter 26 with each other. Here, note that in the filter regeneration control, in cases where the processings of steps S208 and S209 have not yet been carried out, the amount of fuel supply to the exhaust gas by these processings need not be taken into consideration.

(Step 3)

Subsequently, in step 3, the temperature of the oxidation catalyst 3 is calculated based on a detected value by the temperature sensor 13. Then, the oxidation capacity (the consumption capacity of fuel per unit time) of the oxidation catalyst 3 at this point in time is calculated based on the temperature of the oxidation catalyst 3 and the flow rate of the exhaust gas. Specifically, as the temperature of the oxidation catalyst 3 goes up, the oxidation capacity thereof tends to become larger, and as the flow rate of the exhaust gas flowing into the oxidation catalyst 3 becomes larger, the oxidation capacity thereof tends to decrease. Accordingly, a control map on which these tendencies are reflected is stored in the ECU 20, wherein by accessing the control map using as arguments the temperature of the oxidation catalyst 3 and the flow rate of the exhaust gas, the oxidation capacity of the oxidation catalyst 3 (e.g., the oxidation ratio which is a ratio of the concentration of fuel flowing into the oxidation catalyst 3 with respect to the concentration of fuel flowing out from the oxidation catalyst 3) can be calculated.

(Step 4)

Then, in step 4, the fuel concentration Dhc of the exhaust gas flowing into the SCR filter 4 is calculated according to the following expression based on the results of the above-mentioned steps 1 through 3.

> The fuel concentration $Dhc$=(the fuel concentration calculated from the amount of fuel flowing into the oxidation catalyst 3)×(1−the oxidation ratio as the oxidation capacity of the oxidation catalyst 3)

Here, note that the oxidation ratio of fuel in the oxidation catalyst 3 may be dependent on the molecular weight of fuel. That is, fuel of a low molecular weight is relatively easy to be oxidized, and on the other hand, fuel of a high molecular weight is hard to be oxidized. Accordingly, in cases where the supply of fuel by post injection in which fuel of a relatively low molecular weight is supplied is carried out (processing of step S208), the oxidation ratio of the oxidation capacity of the oxidation catalyst may be set higher, in comparison with the case where the supply of fuel by the fuel supply valve 6 in which fuel of a relatively high molecular weight is supplied is carried out (processing of step S209).

When the fuel concentration Dhc is obtained according to the processing of step S205, the processing or routine then goes to step S206. In step S206, it is determined whether the fuel concentration Dhc obtained in step S205 has exceeded a predetermined fuel concentration threshold. Here, the predetermined fuel concentration threshold is an upper limit value of the concentration of fuel in the exhaust gas at which even in cases where the fuel flows out from the oxidation catalyst 3 to the downstream side thereof and reaches the SCR filter 4, a suitable NOx purification rate can be achieved in the SCR filter 4. In the SCR catalyst supported by the SCR filter 4, in cases where the temperature thereof belongs to the high temperature region, fuel may come into the pores in the zeolite of the SCR catalyst so that the fuel poisoning thereof may occur, but in cases where the fuel concentration is lower than the predetermined fuel concentration threshold, the realization of the suitable NOx purification rate is not in fact inhibited. This is considered due to the fact that as a factor to decide the fuel poisoning in the SCR catalyst, there can be mentioned the concentration of fuel in the exhaust gas to which the SCR catalyst is exposed, and when the fuel concentration is lower than the predetermined fuel concentration threshold, the adsorption of fuel to the SCR catalyst for fuel poisoning is hard to be steady.

Then, based on this correlation between the fuel concentration and the fuel poisoning, there can be derived that even in cases where the temperature of the SCR filter 4 belongs to the high temperature region, when the concentration of fuel in the exhaust gas flowing into the SCR filter 4 is equal to or less than the predetermined fuel concentration threshold, it is possible to attain the raising of the temperature of the SCR filter 4 by carrying out the supply of fuel to the exhaust gas by the fuel supply valve 6, i.e., the supply of fuel by the first control. That is, as explained in the above-mentioned first embodiment, in cases where the temperature of the SCR filter 4 belongs to the high temperature region, the supply of fuel by post injection may be carried out in order to avoid the fuel poisoning of the SCR catalyst, but when the concentration of fuel in the exhaust gas flowing into the SCR filter 4 is equal to or less than the predetermined fuel concentration threshold, it is possible to avoid the actual fuel poisoning of the SCR catalyst, and hence, the temperature rise of the SCR filter 4 can be attained by the supply of fuel by the fuel supply valve 6 in which inconveniences such as the limited operation of the internal combustion engine 1, etc., do not occur.

Figure 4:
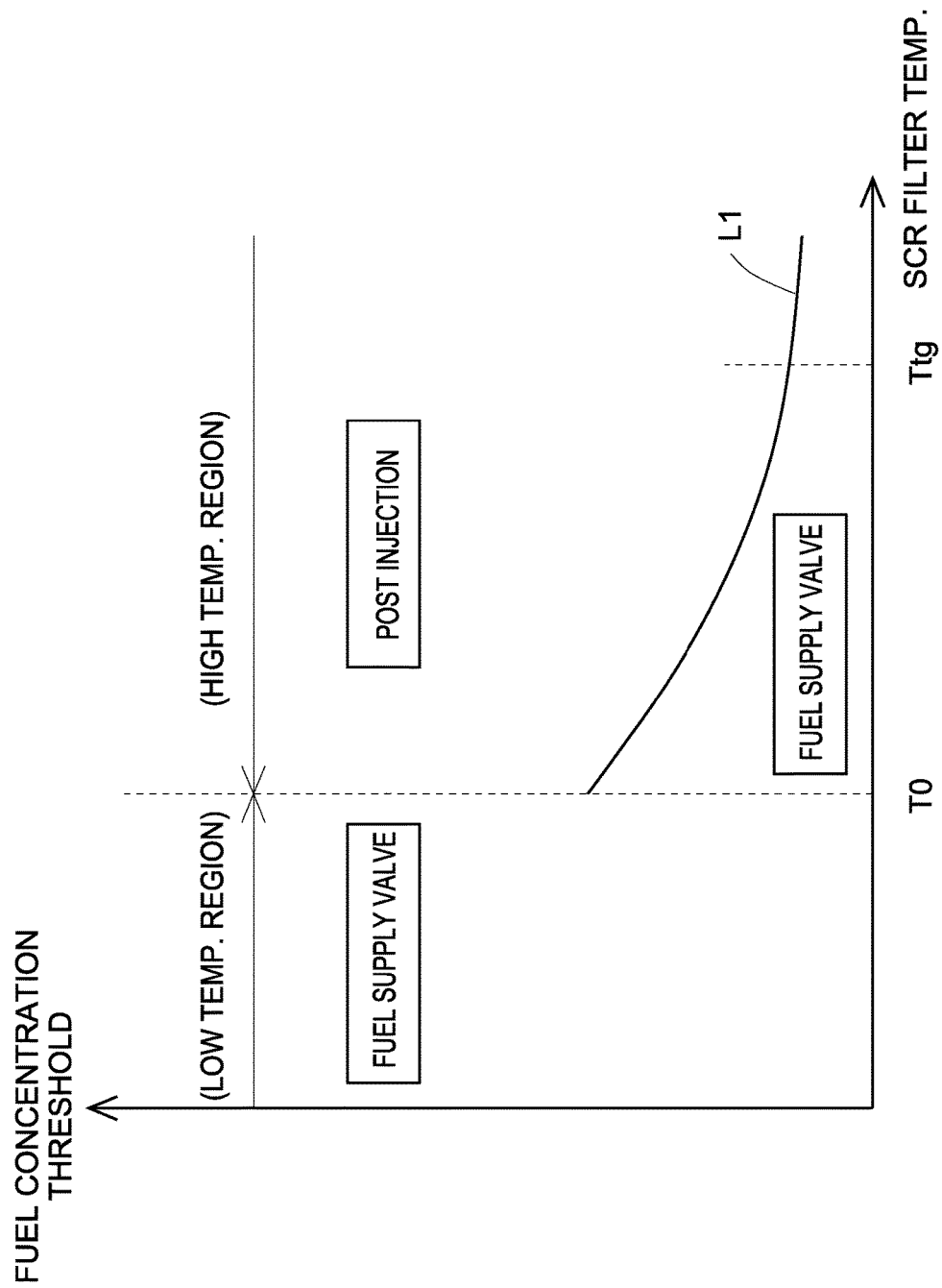
FIG. 4 is a diagram showing the relation between the temperature of an SCR filter contained in the exhaust gas purification system shown in FIG. 1, and the concentration of fuel in exhaust gas at which it is estimated that an NOx selective catalytic reduction catalyst supported on the SCR filter will be in a fuel poisoning state.

Here, note that the predetermined fuel concentration threshold is set, as shown by line L1 in FIG. 4, based on the correlation between the temperature of the SCR filter 4 and the ease of occurrence of fuel poisoning in the SCR catalyst. That is, reflecting the fact that the higher the temperature of the SCR filter 4, the easier the fuel poisoning in the SCR catalyst is to occur, the predetermined fuel concentration threshold is set to become smaller as the temperature of the SCR filter 4 become higher. Accordingly, in the determination in step S206, a comparison will be made between the predetermined fuel concentration threshold set based on the temperature of the SCR filter 4 obtained in step S202, and the fuel concentration obtained in step S205. Then, when an affirmative determination is made in step S206, the routine goes to step S207, whereas when a negative determination is made, the routine goes to step S209.

Then, in step S207, it is determined whether the supply of fuel by post injection is possible in the internal combustion engine 1. For example, in cases where the internal combustion engine 1 is provided with an EGR device, it is necessary to limit the introduction of an EGR gas to a combustion chamber, at the time of carrying out post injection as mentioned above. However, for a predetermined reason such as emissions of the internal combustion engine 1, etc., it may be necessary to give priority to the introduction to the combustion chamber of the EGR gas over the post injection. In such a case, in step S207, a determination will be made that the supply of fuel by post injection is not possible.

In addition, the determination in step S207 may be made from a point of view of whether the fuel supplied to the exhaust gas by post injection can be fully oxidized (burned) by the oxidation catalyst 3. Because the fuel supplied by post injection has a relatively small molecular weight, the whole thereof will be principally oxidized by the oxidation catalyst 3. However, depending on the amount of fuel flowing into the oxidation catalyst 3, or the temperature of the oxidation catalyst 3 or the flow rate of the exhaust gas, which has an influence on the oxidation reaction, the supplied fuel may not be entirely oxidized by the oxidation catalyst 3, and may flow out to the downstream side thereof. It is considered that when the supplied fuel by post injection, which originally has a relatively small molecular weight, flows out of the oxidation catalyst 3, the fuel poisoning of the SCR catalyst is easy to be caused. Accordingly, in cases where it is thus determined that the supplied fuel by post injection cannot be fully oxidized by the oxidation catalyst 3, a determination will be made in step S207 that the supply of fuel by post injection is possible. Here, note that the determination as to whether the supplied fuel by post injection can be fully oxidized by the oxidation catalyst 3 can be made as follows. That is, for example, in cases where the amount of supply of fuel by post injection is larger than a predetermined amount, and in cases where the temperature of the oxidation catalyst 3 is lower than a predetermined temperature, or in cases where the flow rate of the exhaust gas is larger than a predetermined flow rate, it can be determined that the amount of supply of fuel by post injection cannot be fully oxidized.

Thereafter, when an affirmative determination is made in step S207, the routine goes to step S208, whereas when a negative determination is made, the routine goes to step S210. Here, in step S208, the supply of fuel by post injection, which corresponds to the supply of fuel by the second control, is carried out, as in the above-mentioned step S106. In addition, in step S209 to which the routine goes in cases where an affirmative determination is made in step S204 and in cases where a negative determination is made in step S206, the supply of fuel by the fuel supply valve 6, which corresponds to the supply of fuel by the first control, is carried out, as in the above-mentioned step S105. Moreover, in step S210 to which the processing or routine goes in cases where a negative determination is made in step S207, the supply of fuel for the filter regeneration control is stopped, and this filter regeneration control is ended.

Then, after the processing of step S208 or S209 ends, the routine goes to step S211. In step S211, it is determined whether the filter regeneration control should be ended, as in the above-mentioned step S107. When an affirmative determination is made in step S211, the routine goes to step S212, whereas when a negative determination is made, the processings in step S202 and onward are repeated again. Then, in step S212, the supply of fuel to the exhaust gas being carried out for raising the temperature of the SCR filter 4 is stopped, and this filter regeneration control is ended.

Here, the mode of the supply of fuel to the exhaust gas carried out in the filter regeneration control of this second embodiment is shown on a map on the basis of the temperature of the SCR filter 4. FIG. 4 is a map which consists of the temperature of the SCR filter 4, and the fuel concentration of the exhaust gas flowing into the SCR filter 4, wherein line L1 shows the correlation of the predetermined fuel concentration threshold with respect to the temperature of the SCR filter 4, as mentioned above. Here, in cases where the temperature of the SCR filter 4 is equal to or less than T0, the temperature of the SCR filter 4 belongs to the low temperature region, and in that case, the supply of fuel by the fuel supply valve 6 is carried out (see the processings in step S209 and onward after the affirmative determination in the above-mentioned S204). Note that in this second embodiment, as mentioned above, the temperature of the SCR filter 4 belongs to the low temperature region, in a part of the case where the SCR filter 4 is placed in the temperature raising process. Moreover, even in cases where the temperature of the SCR filter 4 has exceeded T0 and belongs to the high temperature region, but in cases where the above-mentioned fuel concentration Dhc has not exceed the predetermined fuel concentration threshold, the fuel supply by the fuel supply valve 6 is carried out (see the processing in step S209 after the negative determination in the above-mentioned step S206). On the other hand, in cases where the temperature of the SCR filter 4 has exceeded T0 and belongs to the high temperature region, and in cases where the above-mentioned fuel concentration Dhc has exceeded the predetermined fuel concentration threshold, the supply of fuel by the post injection is carried out (see the processing in step S208 after the affirmative determinations in the above-mentioned steps S206 and S207). Here, note that in this second embodiment, as mentioned above, the temperature of the SCR filter 4 belongs to the high temperature region, in a part of the case where the SCR filter 4 is placed in the temperature raising stage and in the case where the SCR filter 4 is placed in the temperature holding stage.

According to the above-mentioned control, in cases where the filter regeneration control is carried out in order to oxidize and remove the PM deposited on the SCR filter 4, the mode of the fuel supply to the exhaust gas for raising the temperature of the SCR filter 4 becomes either of the first mode according to the first control or the second mode according to the second control, based on the temperature of the SCR filter 4, i.e., the temperature of the SCR catalyst supported by the SCR filter 4. Specifically, for example, in cases where the SCR filter 4 is placed in the temperature holding stage, the fuel supply by the second control is carried out, whereas in cases where the SCR filter 4 is in the temperature raising stage and the temperature thereof is in the low temperature region, the fuel supply by the first control is carried out. As a result, it becomes possible to achieve the oxidation and removal of the deposited PM, and to avoid the decrease in the NOx purification performance of the SCR filter 4, while aiming at compatibility of the suppression of the limited operation of the internal combustion engine 1 and the dilution of oil on the cylinder wall surface, and the suppression of the fuel poisoning of the SCR catalyst. Moreover, even in cases where the SCR filter 4 is placed in the temperature holding stage and the temperature thereof belongs to the high temperature region, not the post injection but the fuel supply by the fuel supply valve 6 is carried out, as long as the fuel poisoning of the SCR catalyst is suppressed and it is expected that the NOx purification rate by the SCR filter 4 does not drop. For that reason, the chance of being able to suppress inconveniences such as the limited operation of the internal combustion engine 1 will be increased, while avoiding the fuel poisoning of the SCR catalyst.

<Modification>

Here, note that in the filter regeneration control of the above-mentioned second embodiment, post injection is utilized for the fuel supply of the exhaust gas by the second control in step S208, and the fuel supply from the fuel supply valve 6 is not carried out. Instead of this, in step S208, the fuel supply by the post injection and the fuel supply by the fuel supply valve 6 may be used in combination with each other so that the ratio of the amount of fuel supply by the post injection with respect to the amount of fuel supply by the fuel supply valve 6 becomes larger than that at the time of the execution of the first control in step S209. However, in the combined use, in a state where the temperature of the SCR filter 4 belongs to the high temperature region, the amount of fuel supply in particular by the fuel supply valve 6 is controlled not to be excessive, so that the fuel poisoning of the SCR catalyst is not caused.

Further, in cases where the fuel supply by the post injection and the fuel supply by the fuel supply valve 6 are used together in combination in step S209, the ratio of the amount of the fuel supply by the post injection with respect to the amount of the fuel supply by the fuel supply valve 6 in the combined use may be made higher in accordance with the higher temperature of the SCR filter 4, i.e., the higher temperature of the SCR catalyst. In the filter regeneration control of the second embodiment, it is meant that the SCR catalyst is placed in a condition in which the higher the temperature of the SCR filter 4, the SCR catalyst is easy to be subjected to fuel poisoning, and thus, the easier the rate of NOx reduction of the SCR filter 4 is to drop. Accordingly, by adjusting the above-mentioned ratio according to the temperature of the SCR filter 4 in this manner, the higher this temperature becomes, the more the fuel sent into the oxidation catalyst 3 by the second control is made into lower molecular weight, and the harder the decrease of the NOx purification rate becomes to occur.

<Embodiment 3>

Figure 5:
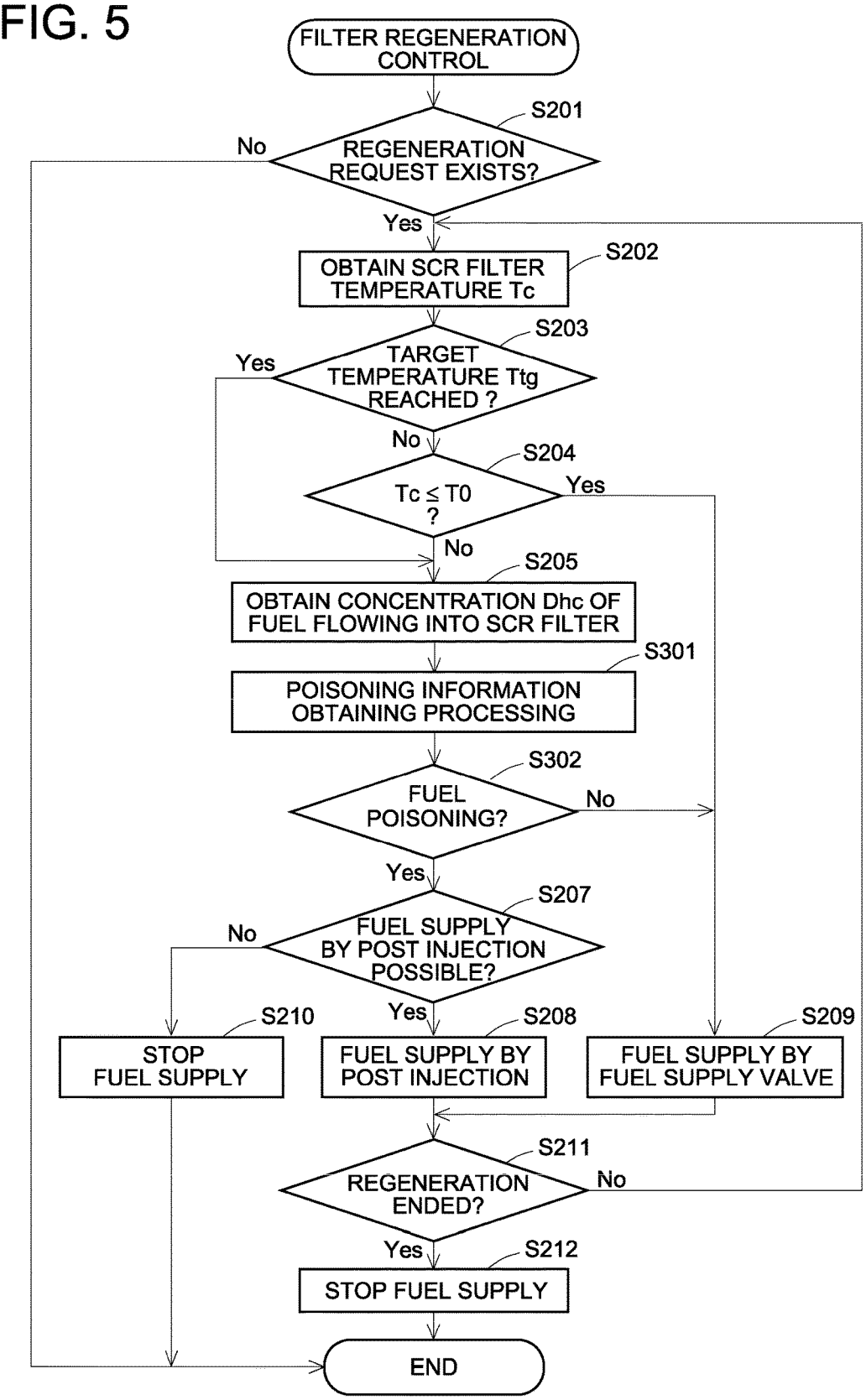
FIG. 5 is a third flow chart with respect to filter regeneration control which is carried out in the exhaust gas purification system shown in FIG. 1.

Reference will be made to a third embodiment of filter regeneration control carried out by the exhaust gas purification system of the internal combustion engine 1, based on FIG. 5. FIG. 5 shows a flow chart of the filter regeneration control carried out by a control program stored in the ECU 20, similar to FIG. 3. Here, note that with respect to those processings which are included in the filter regeneration control shown in FIG. 5, and which are the same as the processings included in the filter regeneration control shown in FIG. 3, the detailed explanation thereof is omitted, by attaching the same reference numerals to the corresponding processings. In the filter regeneration control shown in FIG. 5, processings of steps S301 and S302 are inserted, in place of the processing of step S206 in the filter regeneration control shown in FIG. 3. Accordingly, in the filter regeneration processing shown in FIG. 5, the routine thereof goes to step S301, after the processing of step S205 ends.

Figure 6:
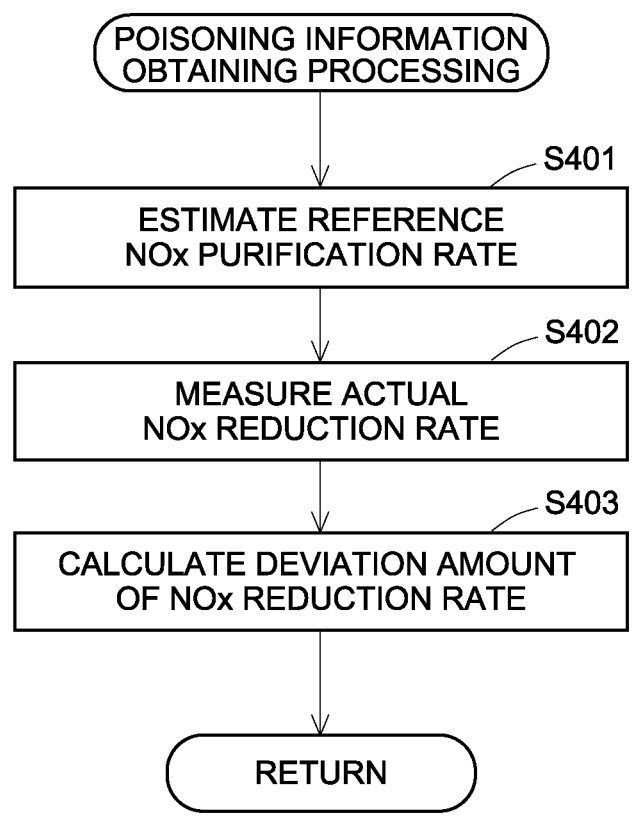
FIG. 6 is a flow chart showing the flow of poisoning information obtaining processing included in the filter regeneration control according to the flow chart shown in FIG. 5.

In step S301, poisoning information obtaining processing is carried out for obtaining information with respect to the poisoning state of the SCR catalyst supported on the SCR filter 4. The information with respect to the poisoning state of the SCR catalyst is a parameter which shows how much the NOx purification performance has decreased due to the adhesion of fuel in the SCR catalyst. The poisoning information obtaining processing will be explained based on FIG. 6. In step S401, a reference NOx purification rate, which should be originally exhibited by the SCR filter 4, is estimated according to one or more parameters related to the NOx purification performance of the SCR filter 4 (corresponding to an "predetermined parameter related to a NOx purification performance of the NOx selective catalytic reduction catalyst" of the present disclosure). Specifically, based on the fact that the NOx purification rate by the SCR filter 4 is affected by the temperature of the SCR filter 4, the flow rate of the exhaust gas, etc., a control map indicating a relation among the temperature of the SCR filter 4, the flow rate of the exhaust gas and the NOx purification rate obtained by previously conducted experiments has been stored in the ECU 20, and the reference NOx purification rate to be originally exhibited by the SCR filter 4 is estimated by accessing the control map. Here, note that this reference NOx purification rate to be originally exhibited is based on a premise that an amount of ammonia suitable for the reduction and removal of NOx has been adsorbed to the SCR filter 4. After the processing of step S401 ends, the routine goes to step S402.

In step S402, the NOx purification rate actually exhibited by the SCR filter 4 is measured. Specifically, according to the above-mentioned expression 1, the actual NOx purification rate is obtained based on the detected values by the NOx sensors 10 and 11. After the processing of step S402 ends, the routine goes to step S403.

Then, in step S403, a deviation amount of the NOx purification rate is calculated by making a comparison between the reference NOx purification rate estimated in step S401 and the actual NOx purification rate measured in step S402. This deviation amount of the NOx purification rate is a parameter which represents to what extent the actual NOx purification rate of the SCR filter 4 deviates from the reference NOx purification rate to be originally exhibited, and most simply, it is calculated as a difference which is obtained by subtracting the actual NOx purification rate from the estimated reference NOx purification rate. It is meant that the larger this deviation amount of the NOx purification rate, to the larger extent the actual NOx purification rate of the SCR filter 4 has dropped or decreased from the reference NOx purification rate to be originally exhibited, and the deviation amount of the NOx purification rate represents the extent of decrease in the NOx purification performance of the SCR catalyst. After the processing of step S403 ends, the routine returns to the filter regeneration control shown in FIG. 5, where the processing of step S302 is carried out.

Then, in step S302, based on the deviation amount of the NOx catalyst obtained by the poisoning information obtaining processing, it is determined whether the SCR catalyst has fallen into a poisoning state. As mentioned above, the deviation amount of the NOx purification rate represents the extent of decrease in the NOx purification performance of the SCR catalyst. Accordingly, in step S302, in cases where the deviation amount of the NOx purification rate exceeds a predetermined value, a determination (an affirmative determination) is made that the SCR catalyst has fallen into the fuel poisoning state, whereas in cases where the deviation amount of the NOx purification rate does not exceed the predetermined value, a determination (a negative determination) is made that the SCR catalyst has not fallen into the fuel poisoning state. Then, when an affirmative determination is made in step S302, the routine goes to step S207, whereas when a negative determination is made, the routine goes to step S209. Here, note that according to the determination result of step S207, the processing or routine goes to step S208 or S210. In addition, in steps S208 and S209, the supply of fuel to the exhaust gas is carried out according to individual modes, respectively, as described up to above.

According to the filter regeneration control configured in this manner, a condition for which the fuel supply by the post injection, i.e., the fuel supply by the second control, is carried out will be further limited, in comparison with the filter regeneration control according to the second embodiment. That is, in the filter regeneration control according to this third embodiment, when a determination is made that the SCR catalyst supported by the SCR filter 4 has fallen into the fuel poisoning state, the fuel supply by the post injection is carried out, whereas until the determination is made that the SCR catalyst has fallen into the fuel poisoning state, the fuel supply by the fuel supply valve 6, i.e., the fuel supply by the first control, is carried out. As a result, the opportunity for the fuel supply by the fuel supply valve 6 is widely secured as much as possible, so that it becomes easy to suppress inconveniences such as the limited operation of the internal combustion engine 1, etc. On the other hand, although the SCR catalyst will be in a certain extent of the fuel poisoning state, the fuel supply by the post injection will be carried out after the SCR catalyst has changed into the fuel poisoning state. In this case, because it becomes difficult for fuel to reach the SCR filter 4, the progress of the fuel poisoning of the SCR catalyst can be suppressed to a large extent, thereby making it possible to suppress the rate of NOx reduction by the SCR filter 4 from further dropping or decreasing. Accordingly, in the determination of the fuel poisoning in step S302, when appropriately setting the above-mentioned predetermined value with which the deviation amount of the rate of NOx reduction is compared, it is possible to attain the compatibility of securing the opportunity for the supply of fuel by the fuel supply valve 6, and maintaining or holding the rate of NOx reduction of the SCR filter 4 after the determination that the SCR catalyst is in the fuel poisoning state.

<Embodiment 4>

Reference will be made to processing with respect to the supply of fuel to the exhaust gas, which can be applied to the filter regeneration control according to the embodiments described up to above, based on FIG. 7. In this fourth embodiment, the fuel injection condition with respect to post injection is adjusted in order to intend to effectively raise the temperature of the exhaust gas by means of the oxidation reaction in the oxidation catalyst 3 of the fuel supplied to the exhaust gas by the post injection. Here, in FIG. 7, parts of the oxidation catalyst 3 in which fuel of a predetermined amount supplied by the post injection is arrived and brought into oxidation reaction are illustrated by shaded areas R1, R2 in a schematic manner. In the upper side (a) of FIG.7, there are illustrated oxidation reaction parts R1, R2 at a low flow rate of the exhaust gas (at the time of low Ga),and in the lower side (b), there are illustrated oxidation reaction parts R1, R2 at a high flow rate of the exhaust gas (at the time of high Ga).

In cases where the predetermined amount of fuel reaches the oxidation catalyst 3, when the flow rate of the exhaust gas is low, the movement of the fuel within the oxidation catalyst 3 is slow, and hence, as illustrated in FIG. 7(*a*), the fuel supplied by the post injection will be used for an oxidation reaction in a relatively narrow range on the upstream side of the oxidation catalyst 3 indicated by the part R1. As a result, the temperature of a relatively wide range on the downstream side of the oxidation catalyst 3 does not go up, but on the contrary, heat is radiated from there to the surroundings of the oxidation catalyst 3, so that the heat of the oxidation reaction does not transfer to the exhaust gas, thus making it difficult to carry out the filter regeneration control in an efficient manner. On the other hand, in cases where the predetermined amount of fuel reaches the oxidation catalyst 3, when the flow rate of the exhaust gas becomes high, since the movement of fuel in the oxidation catalyst 3 is fast, as illustrated in FIG. 7(*b*), the fuel supplied by the post injection will arrive at a relatively wide region including a region beyond the oxidation catalyst 3 indicated by the part R1. For that reason, a part of the supplied fuel will flow out from the oxidation catalyst 3, without being used for the oxidation reaction in the oxidation catalyst 3, thus resulting in factors of useless consumption of the supplied fuel and the fuel poisoning of the SCR catalyst in the SCR filter 4 located on the downstream side of the oxidation catalyst 3.

In view of the above, in this fourth embodiment, in cases where the predetermined amount of fuel is supplied to the exhaust gas by the post injection, when the flow rate of the exhaust gas is large, the fuel injection timing of the post injection is advanced, in comparison with when the flow rate of the exhaust gas is small, in order that the supplied fuel is used as much as possible for the oxidation reaction in the whole of the oxidation catalyst 3. That is, in order for the fuel supplied by the post injection to be used for the oxidation reaction in the part R2 illustrated in FIG. 7, the fuel injection timing of the post injection is retarded in accordance with the decreasing flow rate of the exhaust gas, and the fuel injection timing of the post injection is advanced in accordance with the increasing flow rate of the exhaust gas. When the fuel injection timing of the post injection is retarded, the molecular weight of the fuel contained in the exhaust gas discharged from the internal combustion engine 1 will become large, so that the oxidation reactivity of the fuel in the oxidation catalyst 3 will drop. As a result, the supplied fuel will be used for the oxidation reaction in a state spread to a more downstream side of the oxidation catalyst 3, i.e., in the part R2. In addition, when the fuel injection timing of the post injection is advanced, the molecular weight of the fuel contained in the exhaust gas discharged from the internal combustion engine 1 will become small, so that the oxidation reactivity of the fuel in the oxidation catalyst 3 will be enhanced, and the supplied fuel will be used for the oxidation reaction in a more upstream portion of the oxidation catalyst 3, i.e., in the part R2. As a result, the fuel supplied by the post injection can be used for the oxidation reaction in a wider portion of the oxidation catalyst 3, without being made to flow out to the downstream side thereof, so that effective filter regeneration control is achieved.

<Other Embodiments>

Reference will be made to pre temperature raising processing of the oxidation catalyst, which can be applied to the filter regeneration control according to the embodiments described up to above. The pre temperature raising processing is processing for raising the temperature of the oxidation catalyst 3 to a temperature suitable for starting the fuel supply by the fuel supply valve 6, in cases where the temperature of the oxidation catalyst 3 is low to such an extent that the oxidation reaction of the fuel supplied by the fuel supply valve 6 does not occur in an efficient manner at the time when there is an execution request for filter regeneration control. Specifically, in the pre temperature raising processing, the fuel supply by the post injection is carried out. Because the molecular weight of the fuel supplied by the post injection is relatively small, the temperature of the oxidation catalyst 3 can be quickly raised to a temperature suitable for the oxidation of the supplied fuel by the fuel supply valve 6. As a result, it is possible to advance the oxidation of the supplied fuel by the fuel supply valve 6 in the filter regeneration control described up to above in a smooth manner.

In addition, in the embodiments described up to above, the fuel supply by the post injection is carried out by the second control, but in place of such a mode, the fuel supply by the second control may also be the fuel supply which is achieved by adjusting the fuel injection condition of the internal combustion engine 1 in such a manner that a part of the fuel injected in the vicinity of compression top dead center.

<Second Construction of Exhaust Gas Purification System of Internal Combustion Engine 1>

Figure 8:
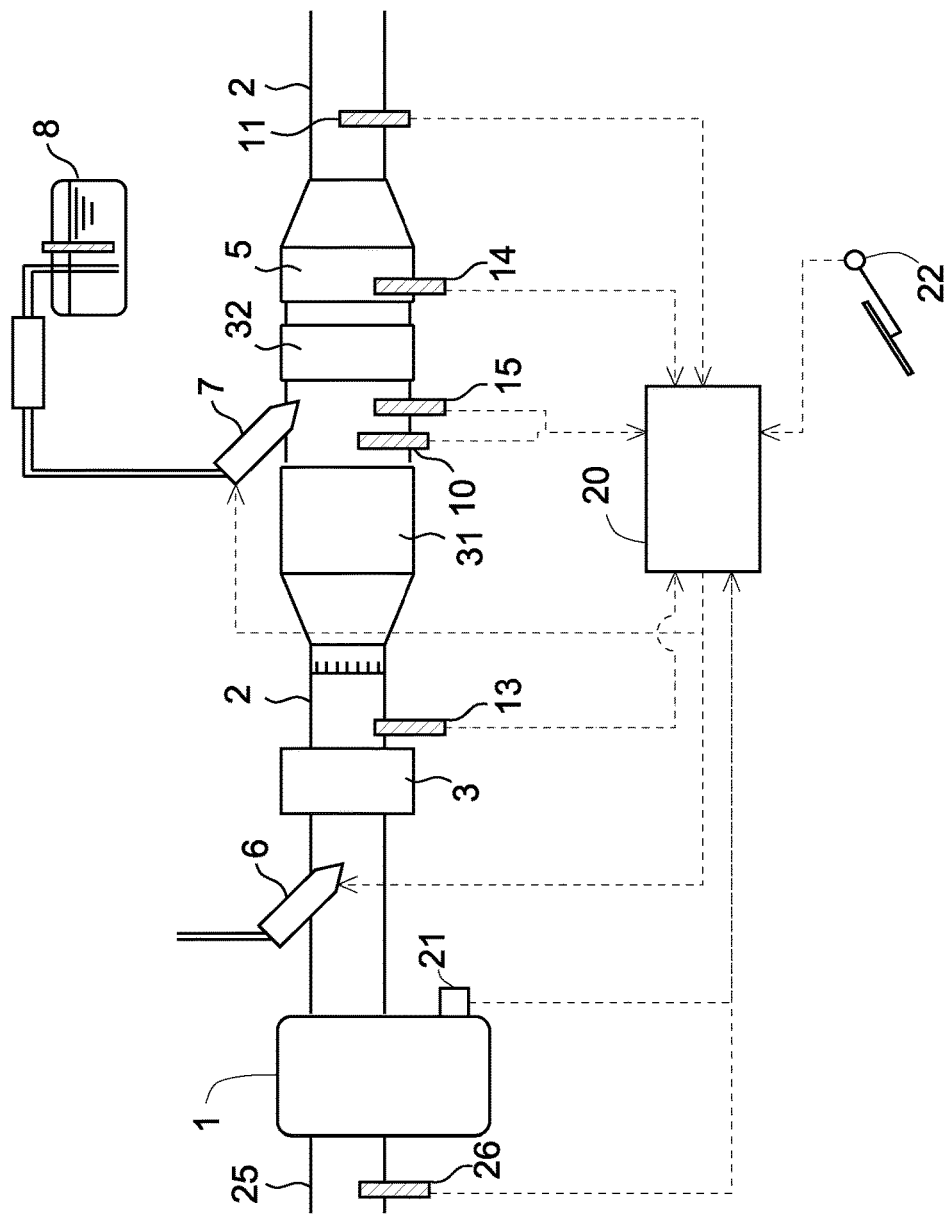
FIG. 8 is a second diagram illustrating schematic construction of an exhaust gas purification system for an internal combustion engine according to the present disclosure.

Next, the filter regeneration control described up to above can be substantially or practically applied to an exhaust gas purification system of the internal combustion engine 1 illustrated in FIG. 8, in place of the exhaust gas purification system of the internal combustion engine 1 illustrated in FIG. 1. In the exhaust gas purification system illustrated in FIG. 8, a filter 31 and an NOx selective catalytic reduction catalyst (SCR catalyst) 32, in place of the SCR filter 4 of the exhaust gas purification system illustrated in FIG. 1, are arranged in the exhaust passage 2. The filter 31 is a wall flow type filter for trapping particulate matter (PM) in the exhaust gas, and the SCR catalyst 32 is disposed on the downstream side of the filter 31. In addition, the supply valve 7, which serves to supply urea water for producing ammonia which acts as a reducing agent in the SCR catalyst 32, is disposed between the filter 31 and the SCR catalyst 32.

Further, a temperature sensor 13 for detecting the temperature of the exhaust gas flowing out from the oxidation catalyst 3 is arranged on the downstream side of the oxidation catalyst 3, and a temperature sensor 14 for detecting the temperature of the exhaust gas flowing out from the SCR catalyst 32 is arranged on the downstream side of the SCR catalyst 32. In addition, a temperature sensor 15 for detecting the temperature of the exhaust gas flowing out from the filter 31 is arranged on the downstream side of the filter 31. Moreover, similar to the exhaust gas purification system described up to above, the crank position sensor 21, the accelerator opening sensor 22, the air flow meter 26 and so on are also disposed or provided, and each of these sensors is electrically connected to the ECU 20, so that a detected value of each sensor is passed to the ECU 20.

In the exhaust gas purification system of the internal combustion engine 1 constructed in this manner, too, in order to oxidize and remove the deposited PM in the filter 31, filter regeneration control is carried out in which fuel is supplied to the exhaust gas in such a manner as to reach the oxidation catalyst 3. At this time, the temperature of the filter 31 is detected by the temperature sensor 15, and the temperature of the SCR catalyst 32 is detected by the temperature sensor 14. At the time of the execution of the filter regeneration control, the exhaust gas with its temperature raised by the oxidation reaction of fuel in the oxidation catalyst 3 flows into the filter 31 thereby to promote the oxidation of the PM, and the exhaust gas, which is raised to a relatively high temperature by the oxidation of the PM, will also flow into the SCR catalyst 32. Accordingly, as a result, when the filter regeneration control is carried out for the oxidation and removal of the deposited PM in the filter 31, the temperature of the SCR catalyst 32 will also go up, and when fuel flows into the SCR catalyst 32 from the upstream side thereof, the SCR catalyst 32 may fall into a fuel poisoning state. Thus, in the exhaust gas purification system of the internal combustion engine 1 constructed as illustrated in FIG. 8, too, by applying the filter regeneration control illustrated in FIG. 2, FIG. 3 or FIG. 5, the fuel poisoning of the SCR catalyst 32 can be avoided, thus making it possible to suppress the decrease of the NOx purification rate resulting therefrom.

<Third Construction of Exhaust Gas Purification System of Internal Combustion Engine 1>

Figure 9:
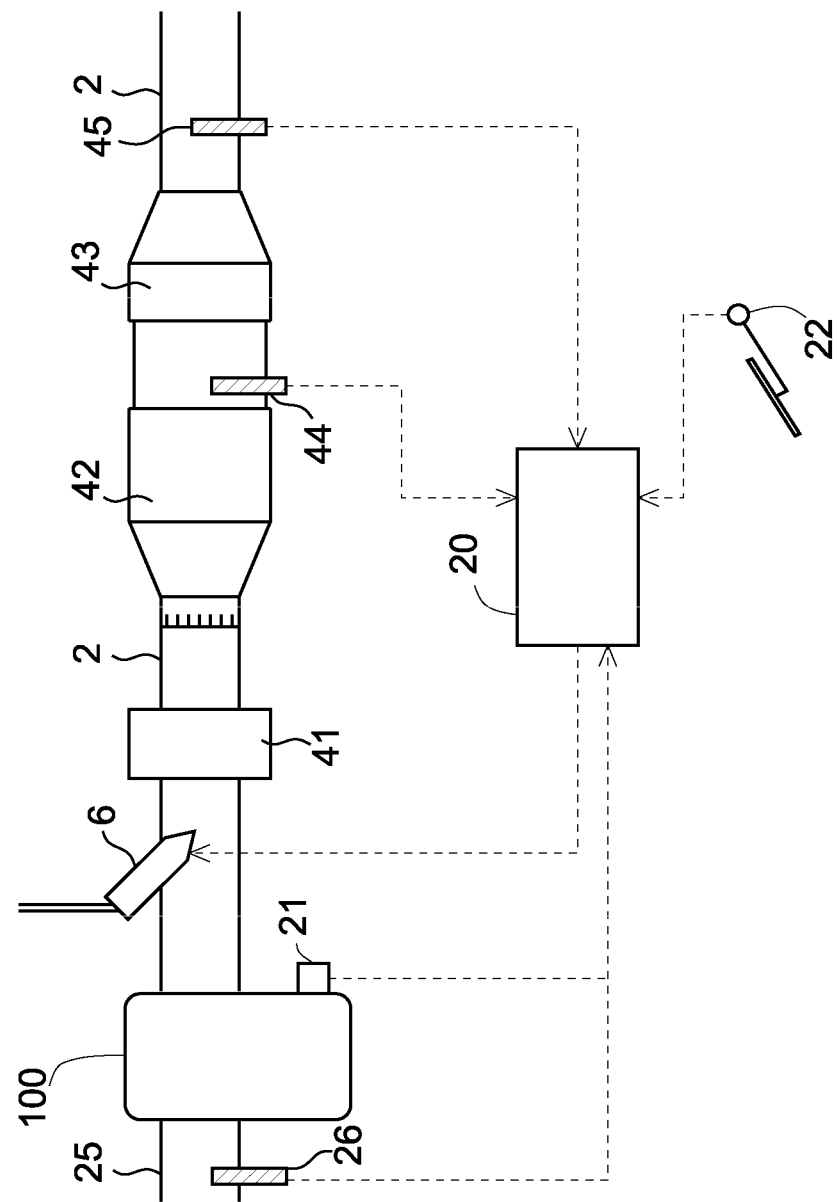
FIG. 9 is a third diagram illustrating schematic construction of an exhaust gas purification system for an internal combustion engine according to the present disclosure.

Reference will be made to another construction of an exhaust gas purification apparatus for an internal combustion engine according to the present disclosure, based on FIG. 9. An internal combustion engine 100 shown in FIG. 9 is a gasoline engine. In the exhaust passage 2 connected to the internal combustion engine 100, there are provided or arranged a three-way catalyst 41, an NOx storage reduction catalyst (hereinafter, referred to as an NSR catalyst) 42, and an NOx selective catalytic reduction catalyst (hereinafter, referred to as an SCR catalyst) 43 sequentially in this order from an upstream side. The three-way catalyst 41 has an oxidation function, and serves to purify or remove NOx, HC and CO with a maximum efficiency at the time when a catalytic atmosphere is at a stoichiometric air fuel ratio. In addition, the NSR catalyst 42 has an occlusion or storage agent for storing or occluding NOx, and serves to occlude or store NOx contained in an incoming exhaust gas when the oxygen concentration of the incoming exhaust gas is high, and to release and reduce the stored NOx when the oxygen concentration of the incoming exhaust gas becomes low and when a reducing agent exists. For the reducing agent to be supplied to the NSR catalyst 42, there can be used the fuel discharged from the internal combustion engine 100 or the fuel supplied by the fuel supply valve 6.

Here, when the exhaust gas passes through the three-way catalyst 41 or the NSR catalyst 42, the NOx in the exhaust gas may react with HC or hydrogen to produce ammonia. For example, if hydrogen is produced from the CO or water in the exhaust gas by a water gas shift reaction or steam reforming reaction, the hydrogen reacts with the NO in the three-way catalyst 41 or in the NSR catalyst 42 thereby to produce ammonia. The ammonia is produced when the air fuel ratio of the exhaust gas passing through the three-way catalyst 41 or the NSR catalyst 42 is equal to or less than the stoichiometric air fuel ratio. The SCR catalyst 43 has adsorbed or stored the ammonia thus produced in the three-way catalyst 41 or the NSR catalyst 42, and carries out selective reduction of NOx by means of the ammonia or reducing agent thus adsorbed or stored, at the time when the NOx passes through the SCR catalyst 43.

Here, in the exhaust gas purification system of the internal combustion engine 100 illustrated in FIG. 9, the fuel supply valve 6 for supplying fuel to the exhaust gas is disposed on the upstream side of the three-way catalyst 41. Accordingly, in this exhaust gas purification system, too, the fuel supply by the fuel supply valve 6, i.e., the fuel supply by the first control, and the fuel supply by the post injection in the internal combustion engine 100, i.e., the fuel supply by the second control, are possible, and the fuel supplied by each of the first control and the second control reaches the three-way catalyst 41 in which it is used for oxidation reaction, and also reaches the NSR catalyst 42 at the further downstream side, where it is used for the above-mentioned production of ammonia.

Further, a temperature sensor 44 for detecting the temperature of the exhaust gas flowing out from the NSR catalyst 42 is arranged on the downstream side of the NSR catalyst 42, and a temperature sensor 45 for detecting the temperature of the exhaust gas flowing out from the SCR catalyst 43 is arranged on the downstream side of the SCR catalyst 43. In addition, similar to the exhaust gas purification system described up to above, the crank position sensor 21, the accelerator opening sensor 22, the air flow meter 26 and so on are also disposed or provided, and each of these sensors is electrically connected to the ECU 20, so that a detected value thereof is passed to the ECU 20.

In the exhaust gas purification system constructed in this manner, the purification of the exhaust gas discharged from the internal combustion engine 100 is attained by the individual exhaust gas purification capacities of the three-way catalyst 41, the NSR catalyst 42, and the SCR catalyst 43. At that time, sulfur oxides (SOx) contained in the exhaust gas may be stored or occluded by the storage agent of the NSR catalyst 42 together with NOx, and then it may be accumulated therein. As the SOx is accumulated in the storage agent, the capacity thereof able to occlude or store NOx is decreased, and as a result, it becomes difficult for the NSR catalyst 42 to exhibit an NOx reduction function which should be originally achieved. Accordingly, in order to release the SOx thus accumulated in the storage agent of the NSR catalyst 42, sulfur poisoning recovery control is carried out in which the temperature of the NSR catalyst 42 is raised and at the same time the NSR catalyst 42 is placed in a rich atmosphere. Specifically, fuel is sent to the three-way catalyst 41 having the oxidation function through the medium of the exhaust gas, whereby a temperature rise of the NSR catalyst 42 is attained so as to raise the temperature thereof to a predetermined temperature by means of the heat of oxidation reaction of the fuel in the three-way catalyst 41. Here, note that the temperature of the NSR catalyst 42 is detected based on a detected value of the temperature sensor 44. In addition, in the sulfur poisoning recovery control, it is necessary to place the NSR catalyst 42 in the rich atmosphere, and hence, an amount of fuel to be supplied to the exhaust gas flowing into the three-way catalyst 41 is determined by taking account of the temperature rise of the NSR catalyst 42 and the formation of the rich atmosphere.

When such sulfur poisoning recovery control is carried out, the temperature of the SCR catalyst 43 goes up in accordance with the temperature rise of the NSR catalyst 42, and the fuel required to form the rich atmosphere also becomes easy to flow into the side of the SCR catalyst 43. As a result, as in the case of the filter regeneration control in the above-mentioned embodiments, in cases where the temperature of the SCR catalyst 43 belongs to the high temperature region, the SCR catalyst 43 is subjected to fuel poisoning, so that the rate of NOx reduction becomes easy to decrease.

In view of the above, in the exhaust gas purification system of the internal combustion engine 100 illustrated in FIG. 9, too, when carrying out the sulfur poisoning recovery control, with respect to the fuel supply to the exhaust gas for raising the temperature rise of the NSR catalyst 42 and forming the rich atmosphere, it is only necessary to appropriately adjust the fuel supply by the fuel supply valve 6 and the supply of fuel by the post injection according to the temperature of the SCR catalyst 43, as in the case of the above-mentioned ordinary filter regeneration control. With this, in the temperature raising stage during the sulfur poisoning recovery control, the fuel supply by the fuel supply valve 6 is carried out in the case where the temperature of the SCR catalyst 43 belongs to the low temperature region, whereas the supply of fuel by the post injection is carried out in the case where the temperature of the SCR catalyst 43 belongs to the high temperature region, as a consequence of which the fuel poisoning of the SCR catalyst 43 is avoided, and the decrease of the NOx purification rate is suppressed.

What is claimed is:

1. An exhaust gas purification system for an internal combustion engine, comprising:
   a first fuel supply unit configured to supply fuel to exhaust gas flowing through an exhaust passage of the internal combustion engine with a supply valve arranged in the exhaust passage;
   a second fuel supply unit configured to supply fuel to exhaust gas to be discharged to the exhaust passage by adjusting a fuel injection condition for the internal combustion engine;
   an oxidation catalyst arranged in the exhaust passage on a downstream side of the supply valve;
   a calculation unit configured to calculate a concentration of fuel in the exhaust gas flowing into an NOx selective catalytic reduction catalyst;
   a threshold obtaining unit configured to obtain, based on the temperature of the NOx selective catalytic reduction catalyst, a predetermined fuel concentration threshold;
   an exhaust gas purification device arranged in the exhaust passage on a downstream side of the oxidation catalyst, the exhaust gas purification device comprising an exhaust gas purification element and the NOx selective catalytic reduction catalyst; and
   a temperature rise control unit configured to carry out temperature raising processing which raises a temperature of exhaust gas flowing into the exhaust gas purification device by supplying fuel to the exhaust gas and oxidizing the supplied fuel in the oxidation catalyst, in order to raise a temperature of the exhaust gas purification element to a predetermined target temperature,
   wherein, in the temperature raising processing, the temperature rise control unit is configured to:
   raise the temperature of the exhaust gas purification element to the predetermined target temperature by performing first control in which fuel supply by the first fuel supply unit is carried out;
   maintain the exhaust gas purification element at the predetermined target temperature by performing at least second control in which a ratio of an amount of fuel supply by the second fuel supply unit with respect to an amount of fuel supply by the first fuel supply unit becomes higher in comparison with that when performing the first control;
   when the temperature of the NOx selective catalytic reduction catalyst exceeds a predetermined temperature threshold and the fuel concentration calculated by the calculation unit does not exceed the predetermined fuel concentration threshold, maintain the exhaust gas purification element at the predetermined target temperature by performing the first control, without performing the second control; and
   when the temperature of the NOx selective catalytic reduction catalyst exceeds the predetermined temperature threshold and the fuel concentration calculated by the calculation unit exceeds the predetermined fuel concentration threshold, maintain the exhaust gas purification element at the predetermined target temperature by performing the second control.

2. The exhaust gas purification system for an internal combustion engine as set forth in claim 1, wherein
   the exhaust gas purification element is an NOx storage reduction catalyst that stores the NOx in the exhaust gas discharged from the internal combustion engine and reduces the NOx thus stored by the supply of a reducing agent; and
   the temperature rise control unit is configured to carry out, as the temperature raising processing, sulfur poisoning recovery processing of removing sulfur oxide deposited on the NOx storage reduction catalyst by performing the first control and then performing the second control.

3. The exhaust gas purification system for an internal combustion engine as set forth in claim 1, wherein
   the temperature rise control unit is configured, in the second control, to carry out only the fuel supply by the second fuel supply unit without performing the fuel supply by the first fuel supply unit.

4. The exhaust gas purification system for an internal combustion engine as set forth in claim 1, wherein
   the temperature rise control unit is configured to make the ratio of the amount of fuel supply by the second fuel supply unit with respect to the amount of fuel supply by the first fuel supply unit in the second control higher as the temperature of the NOx selective catalytic reduction catalyst increases.

5. The exhaust gas purification system for an internal combustion engine as set forth in claim 1, wherein
   the exhaust gas purification element is a filter that serves to trap particulate matter in the exhaust gas discharged from the internal combustion engine; and the temperature rise control unit is configured to carry out, as the temperature raising processing, filter regeneration processing of oxidizing and removing the particulate matter deposited on the filter by performing the first control and then performing the second control.

6. The exhaust gas purification system for an internal combustion engine as set forth in claim 5, wherein
the exhaust gas purification device is formed in such a manner that the NOx selective catalytic reduction catalyst is supported on the filter.

7. An exhaust gas purification system for an internal combustion engine comprising:
a first fuel supply unit configured to supply fuel to exhaust gas flowing through an exhaust passage of the internal combustion engine with a supply valve arranged in the exhaust passage;
a second fuel supply unit configured to supply fuel to exhaust gas to be discharged to the exhaust passage by adjusting a fuel injection condition for the internal combustion engine;
an oxidation catalyst arranged in the exhaust passage on a downstream side of the supply valve;
an exhaust gas purification device arranged in the exhaust passage on a downstream side of the oxidation catalyst, the exhaust gas purification device comprising an exhaust gas purification element and an NOx selective catalytic reduction catalyst;
a temperature rise control unit configured to carry out temperature raising processing which raises a temperature of exhaust gas flowing into the exhaust gas purification device by supplying fuel to the exhaust gas and oxidizing the supplied fuel in the oxidation catalyst, in order to raise a temperature of the exhaust gas purification element to a predetermined target temperature;
an actual purification rate measurement unit configured to measure an actual NOx purification rate of the NOx selective catalytic reduction catalyst based on a concentration of NOx in the exhaust gas flowing into the NOx selective catalytic reduction catalyst, and a concentration of NOx in the exhaust gas flowing out from the NOx selective catalytic reduction catalyst;
a purification rate estimation unit configured to estimate a reference NOx purification rate defined as an NOx purification rate that the NOx selective catalytic reduction catalyst is assumed to exhibit, based on an predetermined parameter related to a NOx purification performance of the NOx selective catalytic reduction catalyst; and
a poisoning determination unit configured to determine whether a fuel poisoning state is formed in the NOx selective catalytic reduction catalyst, based on the actual NOx purification rate measured by the actual purification rate measurement unit and the reference NOx purification rate estimated by the purification rate estimation unit,
wherein, in the temperature raising processing, the temperature rise control unit is configured to:
raise the temperature of the exhaust gas purification element to the predetermined target temperature by performing first control in which fuel supply by the first fuel supply unit is carried out;
maintain the exhaust gas purification element at the predetermined target temperature by performing at least second control in which a ratio of an amount of fuel supply by the second fuel supply unit with respect to an amount of fuel supply by the first fuel supply unit becomes higher in comparison with that when performing the first control;
when the temperature of the NOx selective catalytic reduction catalyst exceeds a predetermined temperature threshold and a determination is made by the poisoning determination unit that the fuel poisoning state is formed, maintain the exhaust gas purification element at the predetermined target temperature by carrying out the second control; and
when the temperature of the NOx selective catalytic reduction catalyst exceeds the predetermined temperature threshold and the determination is not made by the poisoning determination unit that the fuel poisoning state is formed, maintain the exhaust gas purification element at the predetermined target temperature by performing the first control, without carrying out the second control.

8. An exhaust gas purification system for an internal combustion engine comprising:
a first fuel supply unit configured to supply fuel to exhaust gas flowing through an exhaust passage of the internal combustion engine with a supply valve arranged in the exhaust passage;
a second fuel supply unit configured to supply fuel to exhaust gas to be discharged to the exhaust passage by adjusting a fuel injection condition for the internal combustion engine;
an oxidation catalyst arranged in the exhaust passage on a downstream side of the supply valve;
an exhaust gas purification device arranged in the exhaust passage on a downstream side of the oxidation catalyst, the exhaust gas purification device comprising an exhaust gas purification element and an NOx selective catalytic reduction catalyst;
a temperature rise control unit configured to carry out temperature raising processing which raises a temperature of exhaust gas flowing into the exhaust gas purification device by supplying fuel to the exhaust gas and oxidizing the supplied fuel in the oxidation catalyst, in order to raise a temperature of the exhaust gas purification element to a predetermined target temperature; and
a flow rate obtaining unit configured to obtain a flow rate of exhaust gas in the exhaust passage,
wherein, in the temperature raising processing, the temperature rise control unit is configured to:
raise the temperature of the exhaust gas purification element to the predetermined target temperature by performing first control in which fuel supply by the first fuel supply unit is carried out;
maintain the exhaust gas purification element at the predetermined target temperature by performing at least second control in which a ratio of an amount of fuel supply by the second fuel supply unit with respect to an amount of fuel supply by the first fuel supply unit becomes higher in comparison with that when performing the first control,
wherein the second fuel supply unit is configured to supply fuel to the exhaust gas by carrying out post injection in which the fuel injected is hard to contribute to an output of the internal combustion engine, and is configured to advance fuel injection timing of the post injection when the flow rate of exhaust gas obtained by the flow rate obtaining unit is large in comparison with when the flow rate of exhaust gas is small.

* * * * *

UNITED STATES PATENT AND TRADEMARK OFFICE
CERTIFICATE OF CORRECTION

PATENT NO. : 10,337,376 B2
APPLICATION NO. : 15/527891
DATED : July 2, 2019
INVENTOR(S) : Akira Mikami et al.

Page 1 of 1

It is certified that error appears in the above-identified patent and that said Letters Patent is hereby corrected as shown below:

In the Specification

In Column 7, Line 51, after "does", delete "no" and insert --not--, therefor.

Signed and Sealed this
Twentieth Day of August, 2019

Andrei Iancu
*Director of the United States Patent and Trademark Office*